(12) United States Patent
Kerr et al.

(10) Patent No.: US 8,300,675 B2
(45) Date of Patent: Oct. 30, 2012

(54) SPREADING CODE ACQUISITION FOR DIRECT SEQUENCE SPREAD SPECTRUM SIGNALS

(75) Inventors: Ron Kerr, Kanata (CA); Paul Guinand, Peterborough (CA); John Lodge, Dunrobin (CA)

(73) Assignee: Her Majesty the Queen in Right of Canada, as represented by the Minister of Industry, through the Communications Research Centre Canada, Ottawa (CA)

( * ) Notice: Subject to any disclaimer, the term of this patent is extended or adjusted under 35 U.S.C. 154(b) by 245 days.

(21) Appl. No.: 12/779,575

(22) Filed: May 13, 2010

(65) Prior Publication Data

US 2010/0290506 A1 Nov. 18, 2010

Related U.S. Application Data

(60) Provisional application No. 61/177,772, filed on May 13, 2009.

(51) Int. Cl.
*H04B 1/00* (2006.01)

(52) U.S. Cl. .......................................... 375/140; 375/147

(58) Field of Classification Search ........... 375/130–153
See application file for complete search history.

(56) References Cited

U.S. PATENT DOCUMENTS

| | | | | |
|---|---|---|---|---|
| 4,638,494 A | 1/1987 | Kartchner et al. | | 375/367 |
| 5,002,049 A | 3/1991 | Knoll | | 128/200.28 |
| 5,544,155 A | 8/1996 | Lucua et al. | | 370/342 |
| 5,550,811 A | 8/1996 | Kaku et al. | | 370/342 |
| 5,644,591 A | 7/1997 | Sutton | | 375/142 |
| 5,696,762 A | 12/1997 | Natali et al. | | 370/320 |
| 5,825,807 A * | 10/1998 | Kumar | | 375/130 |
| 5,910,948 A | 6/1999 | Shou et al. | | 370/335 |
| 5,940,433 A | 8/1999 | Sawahashi et al. | | 375/149 |
| 6,064,688 A | 5/2000 | Yanagi | | 375/149 |
| 6,069,915 A | 5/2000 | Hulbert | | 375/150 |
| 6,144,691 A | 11/2000 | Kenney | | 375/130 |
| 6,363,049 B1 | 3/2002 | Chung | | 370/310 |
| 6,377,614 B1 | 4/2002 | Yamashita | | 375/149 |
| 6,389,058 B1 | 5/2002 | Lee et al. | | 375/141 |
| 6,560,271 B1 * | 5/2003 | Han | | 375/137 |
| 6,912,227 B1 | 6/2005 | Chang et al. | | 370/441 |

(Continued)

OTHER PUBLICATIONS

R. B. Ward, "Acquisition of pseudonoise signals by sequential estimation," *IEEE Trans Communication*, COM-13, pp. 475-483, Dec. 1965.

(Continued)

*Primary Examiner* — Shuwang Liu
*Assistant Examiner* — Janice Tieu
(74) *Attorney, Agent, or Firm* — Teitelbaum & MacLean; Neil Teitelbaum; Doug MacLean

(57) ABSTRACT

The invention relates to a method and apparatus for acquiring a complex spreading code of a direct sequence spread spectrum signal (DSSS) by acquiring a state of a spreading code generator capable of generating the complex spreading code. A sequence of bipolar differential product values, which sign is independent on data transmitted by the DSSS signal, is obtained by combining in-phase and quadrature samples of the DSSS signal for adjacent chip intervals. This sequence is provided to a linear block decoder for obtaining a codeword of a linear block code, which is defined by a structure of the spreading generator and the differential product operation. The codeword is used to compute the state of the spreading code generator.

20 Claims, 18 Drawing Sheets

U.S. PATENT DOCUMENTS

| | | | |
|---|---|---|---|
| 7,203,893 B2 | 4/2007 | Kerr et al. | 714/780 |
| 7,224,721 B2 * | 5/2007 | Betz et al. | 375/150 |
| 7,613,231 B2 | 11/2009 | Cho | 375/148 |

OTHER PUBLICATIONS

H.M. Pearce and M. Ristenblatt, "The threshold decoding estimator for synchronization with binary linear recursive sequences", *ICC'71 Conference Record*, pp. 43-25 to 43-30, Jun. 12-14, 1971 Montreal Canada.

C.C. Kilgus, "Pseudonoise code acquisition majority logic decoding," *IEEE Trans. on Communication*, COM-21, No. 6, pp. 772-774, Jun. 1973.

R. B. Ward and K.P. Yiu, "Acquisition of pseudonoise signals by recursion aided sequential estimation," *IEEE Trans. on Communications*, COM-25 pp. 784-794, Aug. 1977.

G.L. Stüber, J.W. Mark, and I.F. Blake, "Sequence acquisition using bit estimation techniques," Information Science, vol. 32, No. 3, pp. 217-229, 1984.

P. Guinand and J. Lodge, "Iterative decoding of truncated simplex codes," in *Proc. of 21st Biennial Symposium on Communications*, Kingston, Ont., Jun. 2-5 2002, pp. 82-85.

M. Zhu and K.M. Chugg, "Iterative message passing techniques for rapid code acquisition," in Proc. IEEE Military Communications Conf., 2003.

K.M. Chugg and M. Zhu, "A New Approach to Rapid PN Code Acquisition using Iterative Message Passing Techniques", IEEE Journal of Selected Areas in Comm. vol. 23, No. 5, May 2005, pp. 884-897.

O.W. Yeung and K.M. Chugg, "A Low Complexity Circuit Architecture for Rapid PN Code Acquisition in UWB Systems Using Iterative Message Passing on Redundant Graphical Models," Proceedings of 43$^{rd}$ Allerton Conference on Communication, Control and Computing, Sep. 2005, pp. 698-707.

On Wa Yeung and Keith M. Chugg, "An Iterative Algorithm and Low Complexity Hardware Architecture for Fast Acquisition of Long PN Codes in UWB Systems", J. VLSI and Signal Processing (Springer), Special Issue on UWB vol. 43, Issue 1 (Apr. 2006) pp. 25-42.

F. Principe, K.M. Chugg and M. Luise, Rapid Acquisition of Gold Codes and Related Sequences using Iterative Message Passing on Redundant Graphical Models, Proc. of IEEE Military Communications Conference, 2006.

L.L. Yang and L. Hanzo, "Iterative soft sequential estimation assisted acquisition of m-sequences," Electronic Letters, vol. 38, No. 24, Nov. 2002, pp. 1550-1551.

L.L. Yang and L. Hanzo, "Acquisition of m-Sequences Using Recursive Soft Sequential Estimation," IEEE Trans. on Communications, vol. 52, No. 2, Feb. 2004, pp. 199-204.

L.L. Yang and L. Hanzo, "Differential Acquisition of rn-Sequences Using Recursive Soft Sequential Estimation," IEEE Trans. on Wireless Communications, vol. 4, No. 1, Jan. 2005.

B. Vigoda, J. Dauwels, M. Frey, N. Gershenfeld, T. Koch, H-A Loeliger, and P. Merkli, "Synchronization of Pseudorandom Signals by Forward-Only Message Passing with Applications to Electronic Circuits," IEEE Transactions on Info. Theory, vol. 52, No. 8, Aug. 2006, pp. 2843-3852.

R. Kerr and J. Lodge, "Near ML Performance for Linear Block Codes Using an Iterative Vector SISO Decoder," 4th International Symposium on Turbo Codes Munich, Germany Apr. 2006.

A.K. Eihakeem, H. Zhu, S.A. Al-Semari, "Virtual matched filtering: a new hybrid CDMA code acquistion technique under Doppler and higher CDMA loads," Proc of EUROCOMM 2000, Information Systems for Enhanced Public Safety and Security, pp. 67-74.

M. Ardebilipour, R. Tafazolli, "A novel implitation of reverse link acquisition," 3G Mobile communications Technologies, Conference Publication No. 471, IEEE, 2000.

K.K. Chawla, "Parallel Acquisition of PN Sequences in DS/SS Systems," IEEE Trans. on Comm. vol. 42, No. 5 May 1994, pp. 2155-2164.

S.G. Glisic, T.J Poutanen, W.W. Wu, G.V. Petrovic and Z. Stefanovic, "New PN Code Acquistion scheme for CDMA Networks with Low Signal-toNoise-Ratio," IEEE Trans. on Comm. vol. 47 No. 2, Feb. 1999.

J.K. Holmes and C.C. Chen, "Acquisition Time Performance of PN Spread-Spectrum Systems," IEEE Trans. on Comms. vol. Com 25, No, 8, Aug. 1977. pp. 778-784.

C-F. Li, K-H Pu, and Y-S Chu, "An integrated pseudo-noise code acquisition processor for WCDMA, CDMA2000 and 802.11b Systems," Proc. of IEEE Symp. on Circuits and Systems,2005, pp. 5043-5046 vol. 5.

H. Fu and Y. Zhang, "A new method for fast acquisition of pseudorandom code," Proc. of IEEE 2$^{nd}$ International Symp. on Spread Spectrum and Applications, Yokohama Japan, Nov. 1992 pp. 329-331.

V.M. Jovanovic, "Analysis of Strategies for Serial Search Spread Spectrum Code Acquisition—Direct Approach," IEEE Trans. on Comm vol. 36 No. 11, Nov. 1988, pp. 1208-1220.

C-H Liu, "Adaptive Synchronization and cell search algorithm for WCDMA systems," Proc. 8$^{th}$ Int. Conf. on Communication Systems, 2002, pp. 678-682 vol. 2.

A. Polydoros and C.L. Weber, "A unified approach to serial search spread-spectrum code acquisition—Part I General Theory," IEEE Trans. on Comm. vol. Com 32, No. 5, May 1984.

S. Sarkar, "Analysis of Acquisition in WCDMA Systems," Proc. of ISIT 2000, Sorrento, Italy, Jun. 2000, pp. 133.

Y-P. Wang and T. Ottosson, "Cell Search in W-CDMA," IEEE Journal on Selected Areas of Conununications, vol. 18, No. 8 Aug. 2000.

J. Iinatti, K. Hooli, Effect of Signal Quantisation on WCDMA Code Acquisition, Proc. of 51$^{st}$ Vehicular Technology Conf. 2000, Spring, Tokyo pp. 1271-1275 vol. 2.

* cited by examiner

_8_

Zero extrinsic information for each block
Zero iterationCount while (iterationCount < maximumNumberOfIterations)
    Zero block while(block < maxNumberOfBlocks)

Form input vector of systematic bits and intrinsic values for parity bits for block.

For systematic bits section of input vector, add scaled extrinsic information from other blocks.

Call SISO decoder with input vector and appropriate parity check matrix.

Check return value of decoder to see if valid state was found.

if valid state was found,
            break out of loop with decision bits and return value of decoder.
        otherwise,
            Store extrinsic information for systematic bits from block.

Increment block
    end while

Increment iterationCount
end while

FIG. 17

SPREADING CODE ACQUISITION FOR DIRECT SEQUENCE SPREAD SPECTRUM SIGNALS

CROSS-REFERENCE TO RELATED APPLICATIONS

The present invention claims priority from U.S. Provisional Patent Application No. 61/177,772, filed May 13, 2009, entitled "Blind Code Phase Acquisition for Code Division Multiple Access Signals", which is incorporated herein by reference.

TECHNICAL FIELD

The present invention relates generally to communication systems utilizing spread spectrum signals, and in particular, to a device and method for acquiring a spreading code or a state of a spreading code generator from a received spread spectrum signal.

BACKGROUND OF THE INVENTION

Direct sequence spread spectrum (DSSS) is a method that is used in the transmission of digital information to a receiver. In this technique, the data signal is multiplied by a higher rate spreading sequence, also referred to as a spreading code, to form a wideband signal. This process is known as spreading. Typically, the spreading code is a pseudo-random, also known as pseudo-noise (PN), sequence that is generated at a DSSS transmitter using a spreading generator such as a linear feedback shift register (LFSR).

To recover the data signal, a DSSS receiver must determine the code phase of the received signal and generate a local replica of the spreading sequence. The term "code phase" of a spreading sequence or code refers to a specific position within the spreading sequence corresponding to the received signals. The local replica of the spreading code must be properly aligned with the received signal so that the result of the multiplication of the local replica and the received signal results in the data signal. Determining the code phase of the spreading code for a received signal is known as code phase acquisition, or spreading code acquisition.

A technique wherein the full spectrum of the DSSS signal is shared among a number of users, wherein each of which is assigned a unique spreading code, is known as the direct sequence code division multiple access (DS-CDMA). Commercial applications of DS-CDMA include cellular phone systems. Typically, a conventional DS-CDMA receiver of a commercial CDMA communication system has information about the spreading code of the transmitted spread spectrum signal, so it can successfully de-spread the received signal to obtain the transmitted data after a relatively straightforward code-signal synchronization procedure. However, sometimes there is a need for blind spreading code acquisition, when the receiver has minimal or no information about the spreading code of the received DSSS signal and its code phase. One example is a communication system surveillance or monitoring, wherein the task may be to detect the presence of on-going communications by a third party. In such cases, the receiver lacks the information about the phase of the spreading code, which should be "blindly" recovered for the detection to be successful.

Several prior-art techniques for acquisition of PN sequences, which are generated using a spreading generator of a known structure, utilize a local version of the spreading code and repeatedly correlate the spreading sequence with one or more positions of the received signal until proper alignment is detected. For long PN sequences attempting all positions would be impractical due to the required number of correlations. If no information is available at the receiver about the code phase, the average acquisition time increases with the period of the spreading code. Using a long spreading sequence makes it difficult for a casual eavesdropper to find the correct code phase by correlating with the received signal because the number of possible starting positions that require testing make the correlation techniques impractical.

In the cellular standards "Physical Layer Standard for cdma2000 Spread Spectrum Systems Rev C. Jul. 23, 2004 3 GPP2 C.S0002-C Version 2" and "cdma2000 High Rate Packet Data Air Interface Specification Version 3.0 September 2006 3GPP2 C.S.0024-A", a long PN code is used to allow for a large number of addressable users. The effective period of the spreading code is $2^{42}-1$ chips. At a typical chip rate of 1.2288 Mega-chips per second (Mchips/sec), the spreading code would repeat itself in 41 days, making the blind search for "best correlation" impractical.

One known approach to blind code phase acquisition is to treat the spreading code acquisition problem as a decoding problem. In many cases, the spreading code used in a CDMA system is generated by linear functions operating on the output of a linear system. The structure of the linear system defines a linear code, and conventional methods of decoding of linear block codes can be applied to the spreading code acquisition problem.

A block code is characterized by a doublet (n,k) where n symbols form a code word based on k symbols of information. A valid sequence of n symbols for a block code (n, k) is called a code word, and n and k are hereafter referred to as respectively the length and the dimension of the block code. Since there can be many more possible combinations of n symbols in a block of length n than possible datasets of length k, not all combinations of n symbols can be a valid code word, which assists in decoding.

A block code (n, k) is called a linear block code if the sum of each two code words also is a code word. For binary codes, binary addition is assumed to be an exclusive 'OR' (XOR) operation. A parity check matrix, H, of a linear block code (n,k) is any (n−k)×n matrix of rank (n−k) for which $$Hy=0$$

for any code word y of the linear block code (n, k).

At a receiver, a block decoder is used to estimate the original message based on the received data samples. An input information vector v of length n received by a decoder is said to be related to a code word y of a linear block code (n, k) if it represents the code word y received after a transmission through a noisy channel. The information vector v is also referred to hereafter as a soft information vector, and its elements are referred to as soft values related to code word symbols, or received samples.

A hard decision is said to be taken on an element of a soft information vector if the element is assigned a value of a nearest code symbol by some hard decision rule applied to the modulation symbols. A hard decision vector d related to a soft information vector v is a vector comprised of code symbols in accordance with a certain rule so as to approximate the code word y to which vector v is related.

Known decoding approaches can be divided into two categories distinguished by how they utilize an incoming analogue information stream: these are hard-decision decoding and soft decision decoding. Hard-decision decoders start with input information in a digitized form of code symbols, or "hard decisions", and use decoding algorithms to attempt to correct any errors that have occurred. Soft-decision decoding (SDD) on the other hand utilizes additional information present in the received data stream. SDD starts with soft decision data that may include hard information indicating which value each received symbol is assigned (e.g. a "1" or a "0" for binary symbols) and an associated value that indicates a reliability or confidence that the value assigned to a particular received symbol is correct. This is generally referred to as "soft input" information. A decoder then utilizes the soft input information to decode the received information so as to produce a code word most likely to represent the original transmitted data.

An approach that estimated the code phase by determining the state of the spreading sequence generator from observations of the spreading sequence was presented in R. B. Ward, "Acquisition of pseudonoise signals by sequential estimation," *IEEE Trans Communication*, COM-13, pp. 475-483, December 1965, which is incorporated herein by reference. The algorithm disclosed therein uses the fact that for a linear feedback shift register (LFSR), k chips from the spreading sequence could define the state of the k-stage shift register used to generate the sequence. In the algorithm, k chip hard decisions are made and loaded into a replica of the transmitter's sequence generator in the receiver. The tracking circuit is started and if the k chip decisions were correct, the algorithm will produce the correct sequence and the code phase is acquired. It is determined through correlation whether the local PN sequence is properly aligned. The process of making chip decisions, loading the sequence generator and testing the sequence repeats until code phase is acquired. One disadvantage of this approach is that it requires access to the chip decisions from the channel and thus is unsuitable for signals that are modulated with data. Another disadvantage is that its performance suffers in high noise environments, where chip decisions would have a high probability of error. The algorithm of Ward makes essentially no use of the coding structure available.

A method to acquire the state of a shift register sequence using majority logic decoding was presented in C. C. Kilgus, "Pseudonoise code acquisition majority logic decoding," *IEEE Trans. on Communication*, COM-21, No. 6, pp. 772-774, June 1973. It was also recognised that a k-stage LFSR generates a maximum length code with length $2^{k-1}$. The algorithm of Kilgus makes a number of hard chip decisions, n, on the spreading sequence. The n chip decisions formed a truncated codeword from the maximum length code. A number of independent estimates were obtained for the bits in the initial state of the shift register. Majority logic was employed on the estimates to provide an estimate on the initial state of the k-stage LFSR that generated the n chips of the spreading sequence. The spreading sequence was treated as an (n,k) code and employed a hard decision majority logic decoder to provide an estimate of the initial state of the shift register. One drawback of the method of Kilgus is that it requires chip decisions for the spreading sequence which can be unavailable if data modulation is present.

Other prior art publications utilize common decoding techniques for code phase acquisition, or to acquire a state of the spreading generator from a received signal; these include H. M. Pearce and M. Ristenblatt, "The threshold decoding estimator for synchronization with binary linear recursive sequences," ICC'71 Conference Record, pp. 43-25 to 43-30, Jun. 12-14, 1971 Montreal Canada; R. B. Ward and K. P. Yiu, "Acquisition of pseudonoise signals by recursion aided sequential estimation," TREE Trans. on Communications, COM-25 pp. 784-794, August 1977; G. L. Sather, J. W. Mark, and I. F. Blake, "Sequence acquisition using bit estimation techniques," Information Science, vol. 32, no. 3, pp. 217-229, 1984; P. Guinand and J. Lodge, "Iterative decoding of truncated simplex codes," in Proc. of 21st Biennial Symposium on Communications, Kingston, Ont., Jun. 2-5, 2002, pp. 82-85; M. Zhu and K. M. Chugg, "Iterative message passing techniques for rapid code acquisition," in Proc. IEEE Military Communications Conf., 2003. and K. M. Chugg and M. Zhu, "A New Approach to Rapid PN Code Acquisition using Iterative Message Passing Techniques", IEEE Journal of Selected Areas in Comm. Vol. 23, No. 5, May 2005, pp. 884-897; O. W. Yeung and K. M. Chugg, "A Low Complexity Circuit Architecture for Rapid PN Code Acquisition in UWB Systems Using Iterative Message Passing on Redundant Graphical Models," Proceedings of 43rd Allerton Conference on Communication, Control and Computing, September 2005, pp. 698-707; F. Principe, K. M. Chugg and M. Luise, "Rapid Acquisition of Gold Codes and Related Sequences using Iterative Message Passing on Redundant Graphical Models," Proc. IEEE Military Communications Conf., 2006; L. L. Yang and L. Hanzo, "Iterative soft sequential estimation assisted acquisition of m-sequences," Electronic Letters, Vol. 38, No. 24, November 2002, pp. 1550-1551 and L. L. Yang and L. Hanzo, "Acquisition of m-Sequences Using Recursive Soft Sequential Estimation," IEEE Trans. on Communications, Vol. 52, No. 2, February 2004, pp. 199-204. All of these prior art publications disclose solutions that require knowledge of chip decisions for the spreading sequence that was used to generate the DSSS signal, and thus are not suitable for signals that are modulated with data. Another drawback of the aforementioned prior art methods is that they are formulated for BPSK modulation, while many applications of CDMA utilize complex modulation formats such as QPSK. Furthermore, these methods require the knowledge of the carrier phase for the acquisition to be successful.

In an article by L. L. Yang and L. Hanzo, "Differential Acquisition of m-Sequences Using Recursive Soft Sequential Estimation," IEEE Trans. on Wireless Communications, Vol. 4, No. 1, January 2005, decoding principles were used for the acquisition with a differential operation on consecutive chip samples. The differential operation eliminates the need for accurate carrier phase information and access to the chip decisions, which means it could acquire the sequence in the presence of data modulation. However, the method disclosed by L. L. Yang and L. Hanzo is limited to m-sequence spreading sequences and BPSK modulation.

An object of the present invention is to provide a method and an apparatus for an efficient acquisition of the spreading code of a complex-valued DSSS signal modulated with data.

SUMMARY OF THE INVENTION

In accordance with the invention, a method is provided for acquiring a complex spreading code from a direct sequence spread spectrum (DSSS) signal comprising a data signal spectrally spread with the complex spreading code. The method comprises: a) receiving a sampled DSSS signal obtained by sampling the DSSS signal at a sampling rate at least equal to a chip rate of the complex spreading code, the sampled DSSS signal comprising in-phase signal samples and quadrature signal samples; b) forming a bipolar differential product (DP) signal from the in-phase and quadrature signal samples using a differential product operation, the bipolar DP signal comprising DP values having a sign that is generally independent on the data signal; c) providing a first sequence of n DP values to a decoder for obtaining a first codeword of a linear block code (n, k), wherein the linear block code (n, k) is defined by a spreading code generator (SCG) for generating the complex spreading code and by the differential product operation, wherein k is a length of the SCG, and n is a positive integer greater than k; and, d) determining, based on the first codeword, a first SCG state estimate for generating the complex spreading code.

In accordance with one feature of this invention, each DP value in step b) is obtained by combining the in-phase and quadrature signal samples for two consecutive chip intervals of the complex spreading code. In one embodiment, step b) comprises using a sequence of 2n in-phase signal samples I(t) and a sequence of 2n corresponding quadrature signal samples Q(t) to form the first sequence of n DP values z(l) according to an equation $z(l)=I(l)Q(l-1)-I(l-1)Q(l)$, wherein integer index $l=2t$, integer index $t=1, 2, \ldots, 2n$ denotes time samples, wherein consecutive time samples correspond to consecutive chips of the complex spreading code of the DSSS signal.

Another aspect of the present invention relates to an apparatus for acquiring a complex spreading code from a direct sequence spread spectrum (DSSS) signal, the DSSS signal comprising a data signal spectrally spread with the complex spreading code.

The apparatus comprises a memory for storing at least a portion of a sampled DSSS signal obtained from the DSSS signal by sampling thereof at a sampling rate at least equal to a chip rate of the spreading code, the sampled DSSS signal comprising an in-phase signal composed of in-phase signal samples, and a quadrature signal composed of quadrature signal samples. The apparatus further comprises a differential product (DP) processor operatively coupled to the memory for generating a sequence of n bipolar DP values from the in-phase and quadrature signals using a DP operation, the bipolar DP values having a sign that is generally independent on the data signal.

The apparatus further comprises a decoder operatively coupled to the DP processor for receiving the sequence of n bipolar DP values, and for obtaining therefrom a codeword of a linear block code (n, k), wherein k is a length of a spreading code generator (SCG) for generating the spreading code, and n is a positive integer greater than k, and wherein the linear block code (n, k) is defined by the SCG and the linear differential product operation. The apparatus further comprises a state computer operatively coupled to the decoder for receiving the codeword and for computing therefrom an SCG state estimate based on a pre-computed characteristic of the linear block code (n, k).

Another aspect of this invention provides a DSSS receiver comprising the apparatus for acquiring a complex spreading code from the direct sequence spread spectrum (DSSS) signal that is received by the receiver, the DSSS signal comprising a data signal spectrally spread with the complex spreading code.

Advantageously, the method and apparatus of the present invention can efficiently acquire a complex spreading sequence that has been modulated by a data signal, without requiring chip decisions for the spreading sequence. Spreading sequences that can be acquired using the method and apparatus of the present invention are not limited to m-sequences, but may be any complex spreading sequence that can be generated using a linear binary sequence generator.

BRIEF DESCRIPTION OF THE DRAWINGS

The invention will be described in greater detail with reference to the accompanying drawings which represent preferred embodiments thereof, wherein like elements are indicated with like reference numerals, and wherein:

FIG. 17 is a pseudo-code for the iterative parallel decoding of the noisy codeword of FIG. 16 using the independent parity blocks;

DETAILED DESCRIPTION

Figure 1:
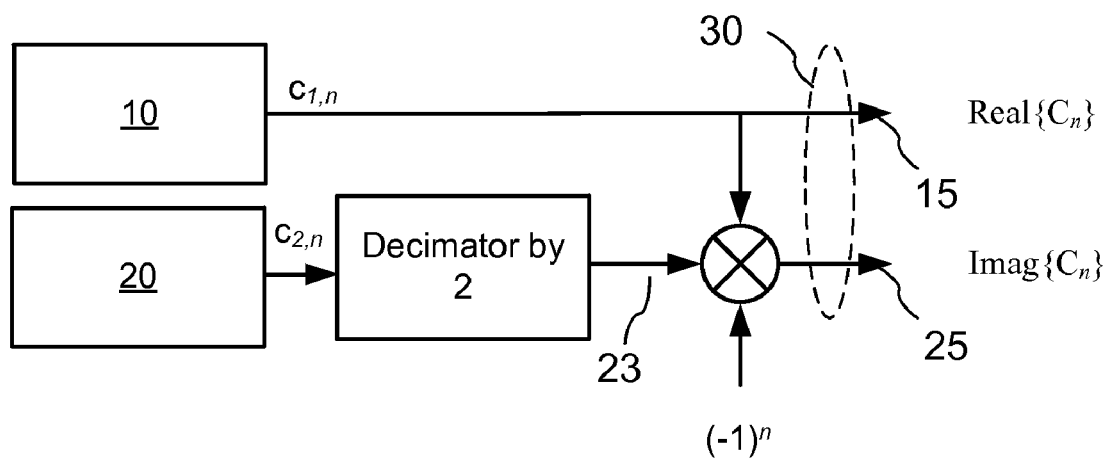
FIG. 1 is a block diagram of one prior art embodiment of a spreading code generator for generating a complex spreading code.

In the context of this specification ordered sequences of symbols may be referred to as vectors; for example, the notation $\{x(i)\}_K$ represents an ordered sequence of the elements $x(i)$, $i=1, \ldots, K$, where K is the length of the sequence, or a set of all elements of a vector $\{x\}$ of length K, so that $\{x\}=\{x(i)\}_K$. An i-th symbol $x(i)$ in a sequence $\{x(i)\}_K$, will also be referred to as the i-th element of a vector x representing said sequence. The subscript "K" in the sequence notation $\{x(i)\}_K$ will be omitted where possible without loss of clarity. The notation $x(i)$ or $x_i$ denotes an i-th element of a vector x, with the index 'i' representing a time sample, or the element location in a sequence of elements represented by the vector x. The notation $mod(x,y)$ denotes x modulo-y arithmetic, so that by way of example, $mod(5,4)=1$ and $mod(4,4)=0$. The notations $Re(x)$, $Real(x)$, $Real\{x\}$ or $Re\{x\}$ each denote a real part of a complex x, wherein x may be a value or a sequence of complex values. The notations $Im(x)$, $Imag(x)$, $Im\{x\}$ or $Imag\{x\}$ each denote a imaginary part of a complex x, wherein x is a complex value or a sequence of complex values.

The following is a partial list of abbreviated terms and their definitions that may be used in the specification:
CDMA Code Division Multiple Access
DSSS Direct Sequence Spread Spectrum
BER Bit Error Rate
CER Codeword Error Rate
PER Packet Error Rate
SNR Signal to Noise Ratio
DSP Digital Signal Processor
FPGA Field Programmable Gate Array
ASIC Application Specific Integrated Circuit
QPSK Quadrature Phase Shift Keying
BPSK Binary Phase Shift Keying
PSK Phase Shift Keying In the context of this specification, the term "codeword" is used to refer to a sequence or block of binary values that a block decoder outputs in response to receiving a valid input sequence of values.

The term "symbol" is used herein to represent a digital signal that can assume a pre-defined finite number of states. A binary signal that may assume any one of two states is conventionally referred to as a binary symbol or bit. Notations '1' and '0' refer to a logical state one and a logical state 'zero' of a bit, respectively. In the description bipolar representation of binary data is assumed unless otherwise stated, wherein logical "0" is represented as 1, and logical "1" is represented as so that each bit can be either 1 or −1. A non-binary symbol that can assume any one of $2^n$ states, where it is an integer greater than 1, and can be represented by a sequence of n bits. The term "bipolar binary", when used in relation to a signal or a value, means that at any given time the signal or the value is fully defined by its sign, and thus can be viewed as being one of +1 or −1. When implemented by hardware, a bipolar binary signal alternates between +V and −V, where 'V' is an implementation dependent constant. The terms "bipolar signal" and "bipolar value", without the limitation "binary", are used to describe signals and values that can be either positive or negative, and may have a varying magnitude. A sequence of binary values represented as "0" and "1" are referred to herein as a bit sequence.

The term "symbol index" or "symbol location index" in reference to a set of data symbols or a set of decoding parameters related to the data symbols, such as hard decisions or reliabilities, refers to an integer representing the location of a data symbol or the related parameter in the corresponding set.

Unless specifically stated otherwise and/or as is apparent from the following discussions, terms such as "processing," "operating," "computing," "calculating," "determining," or the like, refer to the action and processes of a computer, data processing system, logic circuit or similar processing device that manipulates and transforms data represented as physical, for example electronic quantities.

The terms "connected to", "coupled with", "coupled to", and "in communication with" may be used interchangeably and may refer to direct and/or indirect communication of signals between respective elements unless the context of the term's use unambiguously indicates otherwise.

In the following description, reference is made to the accompanying drawings which form a part thereof and which illustrate several embodiments of the present invention. It is understood that other embodiments may be utilized and structural and operational changes may be made without departing from the scope of the present invention. The drawings include flowcharts and block diagrams. The functions of various elements shown in the drawings may be provided through the use of suitable analogue or digital electrical circuitry and dedicated data processing hardware such as but not limited to dedicated logical circuits within a data processing device, as well as data processing hardware capable of executing software in association with appropriate software. When provided by a processor, the functions may be provided by a single dedicated processor, by a single shared processor, or by a plurality of individual processors, some of which may be shared. The term "processor" should not be construed to refer exclusively to hardware capable of executing software, and may implicitly include without limitation, logical hardware circuits dedicated for performing specified functions, digital signal processor ("DSP") hardware, application specific integrated circuits (ASICs), field-programmable gate arrays (FPGAs), read-only memory ("ROM") for storing software, random access memory ("RAM"), and non-volatile storage.

One aspect of this invention relates to acquiring a complex-valued spreading code that is formed using a quadrature combination of two constituent spreading codes, with each chip value of one of the constituent spreading codes extended over two chip intervals of the other constituent spreading code. Spreading codes of this type are used in many DSSS systems and standards, such as CDMA 1x, see "Physical Layer Standard for cdma2000 Spread Spectrum Systems Rev C. Jul. 23, 2004 3 GPP2 C.S0002-C Version 2", and Wideband CDMA, see "$3^{rd}$ Generation Partnership Project; Technical Specification Group Radio Access Network; Spreading and modulation (FDD) Release 4 3G 3G TS 25.213 V4.3.0 (2002-06)". Accordingly, various embodiments of the invention include features that exploit the structure of the spreading code to improve the efficiency of the spreading code acquisition from a received DSSS signal in the presence of data related modulation. In the context of this specification, the terms "spreading code" and "spreading sequence" are used interchangeably, and the terms "spreading code generator" and "spreading sequence generator" are also used interchangeably. The term "acquiring spreading code" is understood herein to mean acquiring a phase of the spreading code that corresponds to a received DSSS signal or a portion thereof, and is functionally equivalent to acquiring a state of a spreading code generator that produces the spreading code with a correct phase when starting with the state.

Referring first to FIG. 1, there is shown a schematic block diagram of an SCG 5 that has features which are commonly used for spreading code generation in DSSS transmitters. The SCG 5 outputs two real-valued spreading sequences 15 and 25, labelled as $Real\{C_i\}$ and $Imag\{C_i\}$, which can be viewed as the real and imaginary parts of one complex spreading sequence $\{C_i\}$ 30, i.e. in accordance with $\{C_i\}=\text{Real}\{C_i\}+j\cdot\text{Imag}\{C_i\}$, wherein $j=\sqrt{-1}$. The complex-valued spreading sequence $\{C_i\}$ 30 is obtained as a quadrature combination of a first spreading code $\{c_{1,i}\}$ generated by a first spreading code generator 10, and a second spreading code $\{c_{2,i}\}$ generated by a second spreading code generator 20, with each chip value $c_{2,i}$ of the second spreading code extended over two chip intervals of the first spreading code, with an alternating sign. Here, $C_i$ represents a chip value, which is complex, of an $i^{th}$ chip of the complex spreading code $\{C_i\}$ 30, $c_{1,i}$ represents a chip value of an $i^{th}$ chip of the first spreading code, and the subscript i is an integer which refers to a position of a particular chip of the spreading code in time, with i and i+1 referring to two consecutive chips in the spreading code's time sequence. The first and second spreading codes $c_1$ and $c_2$ are also referred to herein below as the first and second constituent spreading codes, with the respective spreading generators 10 and 20 referred to as the first and second constituent spreading generators, respectively. A contiguous segment or block of the complex spreading code $\{C\}$ starting with any given chip i is fully defined by a state of the SCG 5 at a time instance when the chip i is generated by the SCG 5.

The first and second spreading code generators 10, 20 are linear systems, such as Linear Feedback Shift Registers (LFSR) as known in the art; the constituent spreading codes they generate may be defined by a set of linear equations based on states of the LFSRs at a particular moment in time.

In the shown embodiment, the first spreading code $\{c_{1,i}\}$ provides the real, or in-phase (I) component of the spreading code $\{C_i\}$, while the imaginary, or quadrature (Q), component of $\{C_i\}$ is obtained by multiplying chip values $c_{1,i}$ of the first spreading code $\{c_{1,i}\}$ by corresponding chip values of a decimated spreading code $\{c_{2,2p}\}$ 23 that has been obtained by decimating the second spreading code by a factor of 2, and alternating the sign of the product for consecutive chip intervals. Accordingly, the complex-valued spreading code $\{C_i\}$ 30 can be described by the following equation:

$$C_i=c_{1,i}(1+j(-1)^i c_{2,2p}), \quad (1)$$

wherein p is the greatest integer not exceeding i/2, and may be represented by the floor function: $p=\text{floor}(i/2)$. Here, $C_{2,2p}$ represents a chip value of a $(2p)^{th}$ chip of the second spreading code. Typically, the first and second spreading codes $\{c_{1,i}\}$ and $\{c_{2,i}\}$ are bipolar binary sequences, that is binary sequences wherein each bit value $\{0,1\}$ is mapped to $\{1,-1\}$, or in other words each logical "1" is represented as $-1$, and each logical "0" is represented as $+1$.

In a DSSS transmitter, the complex spreading code $\{C_i\}$ having a chip rate $R_c$ is modulated, i.e. multiplied, by a complex data signal composed of an in-phase and a quadrature component. The data signal can be represented as a sequence of complex data symbols D at a data rate $R_d$, each having a symbol duration typically exceeding the chip interval of the spreading code, so that $R_d<R_c$. Chip values of a data-modulated spreading code $\{r_i\}$ produced thereby are defined by the following equations (2) and (3), wherein $D_i$ is the complex data associated with the $i^{th}$ chip interval of the spreading code, and is composed of real data values $d_{1,i}$ and $d_{2,i}$:

$$r_i=C_i\cdot D_i, \quad (2)$$

$$D_i=d_{1,i}+jd_{2,i}. \quad (3)$$

The data modulated spreading code $\{r_i\}$ is then transmitted over a communication channel, for example wirelessly by modulating a wireless carrier signal to obtain a wireless DSSS signal. For the sake of clarity, the following description will concentrate on embodiments wherein the data $d_{1,i}$ and $d_{2,i}$ are in the bipolar binary form, which is the case for most current DSSS systems, although the present invention is not limited to the transmission of binary data, and is applicable for non-binary multi-level transmission systems as described hereinbelow.

The real and imaginary parts of the data modulated spreading code defined by equation (2) are commonly referred to as the in-phase (I) and quadrature (Q) components thereof, respectively, and give rise to the in-phase and quadrature components of the DSSS signal.

Aspects of the method of the present invention may be understood by considering a differential product (DP) $r_k r^*_{k+1}$ of two adjacent chips $r_k$ and $r_{k+1}$ of the bipolar data-modulated spreading code $\{r_i\}$, when k is an even number, and $r^*$ is the complex conjugate of r. From equations (1)-(3), the following equations for the real and imaginary values of the differential product can be obtained:

$$Re(r_k r^*_{k+1})=2c_{1,k}c_{1,k+1}c_{2,k}(d_{1,k}d_{2,k+1}-d_{1,k+1}d_{2,k}) \quad (4)$$

$$Im(r_k r^*_{k+1})=2c_{1,k}c_{1,k+1}c_{2,k}(d_{1,k}d_{1,k+1}+d_{2,k}d_{2,k+1}) \quad (5)$$

where $Re(r_k r^*_{k+1})$ and $Im(r_k r^*_{k+1})$ denotes the real and imaginary parts of the complex differential product (DP) $r_k r^*_{k+1}$, respectively. When both the $k^{th}$ and the $(k+1)^{st}$ chips of the spreading code are associated with a same data bit, i.e. $d_{1,k}=d_{1,k+1}$ and $d_{2,k}=d_{2,k+1}$, equations (4) and (5) become $$Re\{r_k r^*_{k+1}\}=0, \quad (6)$$

and $$Im(r_k r^*_{k+1})=4c_{1,k}c_{1,k+1}c_{2,k}. \quad (7)$$

Advantageously, the right hand side (RHS) of equation (7), which is proportional to the product of three bipolar binary values that are elements of the spreading codes, is independent on the data signal. For the binary bipolar spreading codes $\{c_{1,i}\}$ and $\{c_{2,i}\}$, the multiplications in the RHS of equation (7) are equivalent to binary addition operating on binary representations of $\{c_{1,i}\}$ and $\{c_{2,i}\}$, and therefore eq. (7) defines a linear operation. Since the binary bipolar spreading codes $\{c_{1,i}\}$ and $\{c_{2,i}\}$ are themselves formed using linear operations based on the state of the constituent spreading generators 10 and 20, the RHS of eq. (7) defines a linear code; a sequence of n values given by the RHS of eq. (7) for even values of $k=2l$, wherein $l=l_1,\ldots,(l_1+n)$ with integer $l_1$, can be viewed as a code word of $(n, k_c)$ block encoder for a particular and unique state of the SCG 5, wherein $k_c$ is the length of the SCG 5, i.e. the number of bits required to define its state.

Accordingly, in systems where the number of chips of the spreading code $\{C\}$ per one data symbol is even, a sequence of substantially data-independent signal samples may be obtained from a received DSSS signal representing the data-modulated spreading code $\{r_i\}$, by forming a bipolar differential product (DP) signal from the received DSSS signal sampled at the chip rate $R_c$, taking an imaginary part thereof, and puncturing out every other element so as to obtain a bipolar differential product sequence with elements corresponding to $Im(r_k r^*_{k+1})$ with even k. However, it will be appreciated that the differential product sequence can also be generated directly from the sampled DSSS signal without having a complex product or a puncturing operation.

Exemplary embodiments of the apparatus and method of the present invention for acquiring a complex spreading code from the received DSSS signal will now be described with reference to schematic block diagrams and flowcharts shown in FIG. 2, and also FIGS. 3-8 and 12. Blocks in the block diagrams represent various functional units, which can be integrated or separate structures commonly known to provide their respective functionalities, including general purpose processors, DSPs, ASICs, FPGAs, and analogue RF, HF and UHF circuitry.

Figure 2:
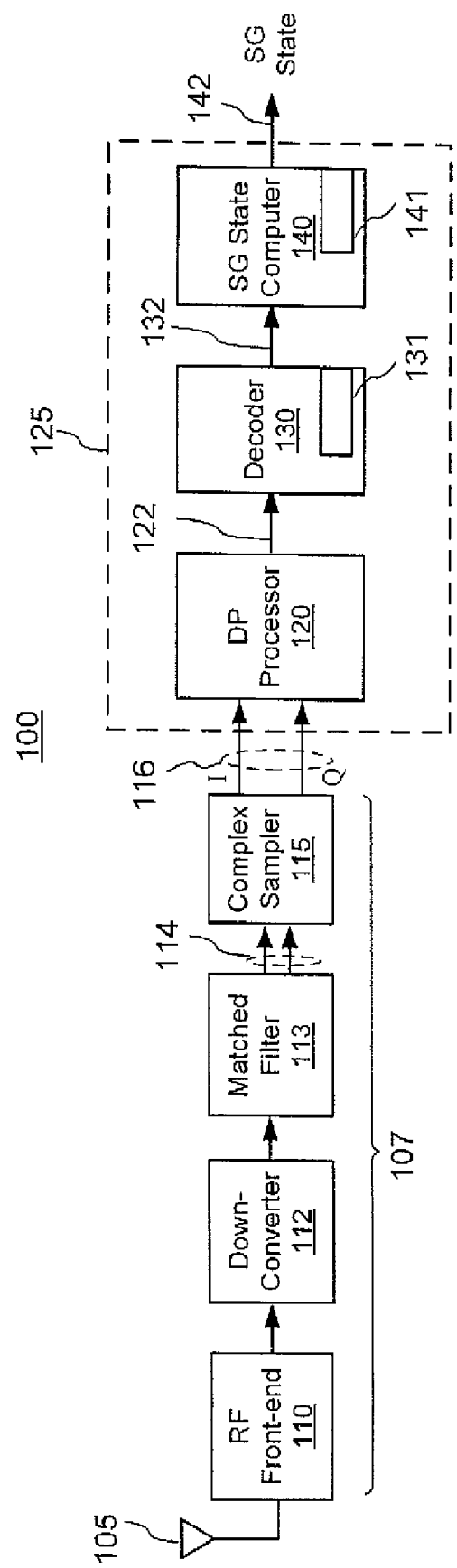
FIG. 2 is a block diagram of an apparatus for acquiring the state of a spreading code generator according to an embodiment of the present invention.

Referring now to FIG. 2, there is shown an apparatus 100 for acquiring a state of a spreading code generator, such as the SCG 5, from a wirelessly received DSSS signal, according to an embodiment of the present invention. As known in the arts, acquiring the state of an SCG is equivalent to acquiring the spreading code generated by the SCG; accordingly, it will be appreciated that the apparatus 100 can also be referred to as being for acquiring a complex spreading code from the received DSSS signal spread therewith. The apparatus 100 may be embodied as a separate device, or may constitute a front-end portion of a DSSS receiver, as described in further detail hereinbelow. The apparatus 100 includes an RF antenna 105, which connects to a front-end RF circuit 110, which in turn connects to a matched filter 113, followed by a complex sampler 115, which in turn connects to a state acquisition processor (SAP) 125. The functional blocks 105, 110, 112, 113 and 115 may be elements or circuits forming an analog front-end 107, with a digital output, of a conventional wireless receiver, which are well known and will not be described herein in detail. In one embodiment, the functional blocks 110, 112, 113 and 115 may be omitted from the apparatus 100, so that the apparatus 100 consists substantially of the SAP 125, and may be used in conjunction with a conventional DSSS receiver utilizing its circuitry for providing a sampled DSSS signal 116 described hereinbelow.

Functional units of SAP 125 shown as blocks are adopted to perform one or several steps of a method for spreading code acquisition according to embodiments of the present invention. These steps will be described hereinbelow with reference to block diagrams in FIGS. 2, 3, 5, 6, 8, 12, and also to flowcharts in FIGS. 4, 7. The functional blocks of the SAP 125 may be implemented in either software or hardware or a combination thereof commonly known to provide the functionalities described hereinbelow, including but not limited to a general purpose processor, microprocessor, DSP, ASIC, and FPGA.

A function of the SAP 125 is to determine the state of the SCG 5, or a state of an equivalent SCG, corresponding to the received DSSS signal based on said signal. Once the SCG state is determined, a correct spreading sequence can be generated using a local replica of the SCG 5, or the equivalent SCG, so that the transmitted data signal D can be successfully extracted by de-spreading the received DSSS signal as known in the art.

In operation, the RF antenna 105 receives the wireless DSSS signal carrying a data-modulated spreading code, such as $\{r_i\}$ described hereinabove with reference to FIG. 1, and passes the received DSSS signal to the front-end RF circuit 110 for suitable conditioning thereof as known in the art. Typically, the front-end RF circuit 110 includes one or more amplifiers and one or more filters to condition the received DSSS signal. From the front-end RF circuit 110, the received DSSS signal is passed to the down-converter 112, which includes one or more frequency down-conversion stages to bring the received DSSS signal to the baseband. The down conversion can be carried out by multiplying the filtered signal by a signal from an oscillator operating at the desired carrier frequency. The matched filter 113 is an optimal linear filter matched to the transmitter pulse shape and may be used for maximizing an output signal to noise ratio (SNR) as known in the art. The matched filter 113 outputs the received DSSS signal as a complex analog baseband signal 114 composed of two real-valued analog signals, which are conventionally referred to as an in-phase and quadrature signals. In other embodiments, the matched filter may be a digital filter that follows the complex sampler 115, or may be omitted.

The complex sampler 115 is an analogue to digital converter (ADC) that converts the received complex DSSS signal to a digital format. More particularly, the ADC 115 samples the received baseband DSSS signal 114 at a sampling rate $R_s$ that is at least equal to the chip rate $R_c$ of the spreading code, and outputs a sampled complex DSSS signal $\hat{r}$ 116 that may be in the form of a sequence of complex samples $\hat{r}(i)$; here, index i is an integer representing digitized time samples. In the absence of noise, and assuming correct timing of the sampling process, each of these complex samples $\hat{r}(i)$ may correspond to a particular chip of the data modulated spreading code $\{r\}$ generated in the DSSS transmitter (not shown) incorporating the SCG 5; in the case of oversampling, there may be several complex samples $\hat{r}(i)$ corresponding to a same chip of the data modulated spreading code $\{r_i\}$.

In exemplary embodiments described hereinbelow, the ADC 115 outputs the sampled complex DSSS signal 116 in the form of two discrete signals: an in-phase signal I that is composed of in-phase signal samples I(i), and a quadrature signal Q that is composed of quadrature signal samples Q(i), so that $$\hat{r}(i)=I(i)+jQ(i). \tag{8}$$

In one preferred embodiment, the in-phase and quadrature signals I and Q are discrete bipolar signals corresponding to the real and imaginary parts of the data-modulated spreading code $\{r_i\}$, respectively, which are at least partially corrupted by noise during the transmission.

The ADC 115 may operate at the chip rate $R_c$ of the received DSSS signal, or at a multiple thereof. In one embodiment, the ADC 115 has an output sampling rate $R_s = m \cdot R_c$, where m is an integer equal or greater than 1, so as to output in complex samples $\hat{r}(i)$, or equivalently, m pairs of real signal samples per one chip interval of the transmitted DSSS signal. In some embodiments, the front-end portion 107 may be omitted, and the sampled complex DSSS signal 116 may be obtained from a separate device such as a conventional DSSS receiver.

The sampled complex DSSS signal 116 is then provided to the SAP 125, which includes a differential product (DP) processor (DPP) 120, a linear decoder 130 and a state computer 140, which are operatively connected in series. The SAP 125 operates at the chip rate $R_c$, or at the sample rate $R_s$ of the ADC 115, and attempts to re-constructs from the received sequences $\{I(i)\}$, $\{Q(i)\}$ a state of the SCG 5 corresponding to the received DSSS signal, which is termed hereinbelow "the SCG state", or to obtain at least an estimate thereof.

In operation, the DPP 120 receives the sampled complex DSSS signal $\hat{r}$ 116, performs a DP operation thereupon, and obtains therefrom a discrete bipolar DP signal $\{z\}$ comprised of bipolar DP values. One feature of the DPP 120 is that the DP operation it performs is linear in the binary field, i.e. when applied to bipolar binary sequences, and thus the sign of the DP values it produces can be described as a linear binary code that may be decoded using a suitable decoder. Another feature of the DP operation performed by the DPP 120 is that the sign of an output sequence 122 of the DP values is generally independent of the data signal D, thereby facilitating decoding of the sequence and the acquisition of the SCG state that produced the sequence. To accomplish that, the DP operation exploits correlations between adjacent chips of the complex spreading code C that are related to the structure of the SCG, such as the presence of the decimator by 2 in the Q-channel of the SCG 5, whereby each value of the second spreading code is predictably extended over two chip intervals of the first spreading code. In exemplary embodiments described hereinbelow, the DP values are produced by combining products of the in-phase and quadrature signal samples for two consecutive chip intervals of the spreading code. Particular implementations of the DP operation depend on the structure of the corresponding SCG, and will be described hereinbelow by way of examples.

From the DPP 120, the output sequence 122 of n DP values $z(l)$, $l=1, \ldots, n$ is provided to the decoder 130 for obtaining a codeword of a linear block code $(n, k_c)$, which is defined by constraints of the SCG 5 and of the DP operation as described hereinbelow. Here, $k_c$ is a length of the SCG 5, i.e. the number of bits defining the state of the SCG 5, which is also referred to herein as the dimensionality of the SCG 5, and n is a positive integer greater than $k_c$. Advantageously, since the sign of the DP values provided to the decoder 130 is independent on the data signal, the decoder 130 does not require any information about the data signal D.

The codeword generated by the decoder 130 is then provided to the state computer 140 for computing an estimate of the state of the SCG 5 that corresponds to the sampled DSSS signal $\hat{r}$, which may also be referred to herein below as the SCG estimate, or the first ECG estimate.

In the embodiment of the invention wherein the spreading code C of the DSSS signal is generated using the alternating-sign configuration of the SCG 5, the DP operation is equivalent to taking an imaginary part of the discrete complex DSSS signal $\hat{r}=\{\hat{r}(i)\}$ multiplied by a complex conjugate copy thereof that is shifted in time by one chip interval, i.e. computing $\text{Im}\{\hat{r}(i)\cdot\hat{r}^*(i+m)\}$, where m is the number of samples per chip interval, and puncturing the resulting sequence by 2, or, equivalently, selecting every second element thereof, beginning with a selected starting time sample. Assuming that the time samples i in the punctured sequence correspond to chips of the spreading code $\{C\}$ with an even chip index in equation (1), the resulting complex DP values $z(i)=\text{Im}\{\hat{r}(i)\cdot\hat{r}^*(i+m)\}$ correspond to the RHS of equation (7), which is corrupted by noise.

Figure 3:
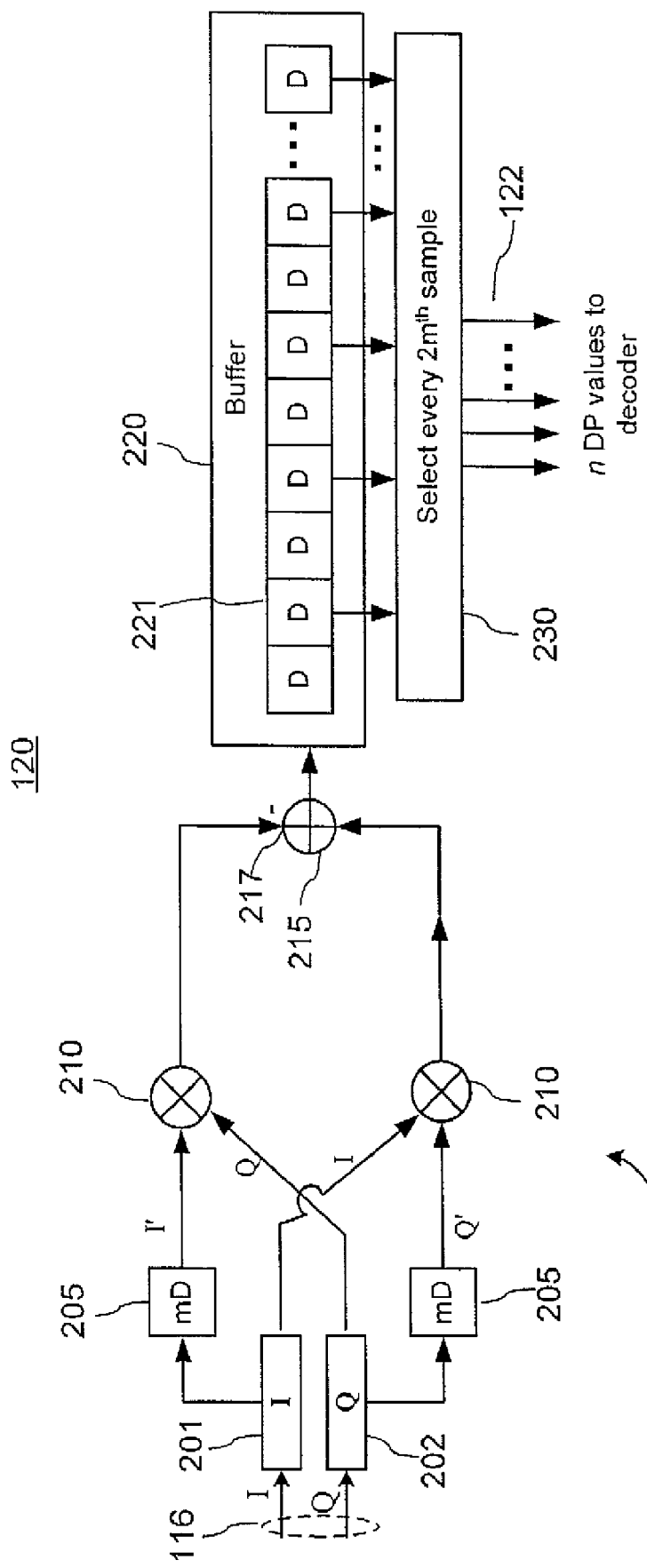
FIG. 3 is a block diagram of a state acquisition processor of the apparatus of FIG. 1 according to an embodiment of the present invention.

FIG. 3 schematically illustrates one embodiment of the DPP 120. At its input, it includes a DP computation circuitry 250, which receives the input sequences 116 of the in-phase and quadrature signal samples I(i) and Q(i) from the ADC 115, and computes therefrom, for each time sample i, a DP value according to equation (9):

$$z(i)=Q(i-m)\cdot I(i)-I(i-m)\cdot Q(i), \qquad (9)$$

It will be appreciated that the RHS of equation (9) is equivalent to taking the imaginary part of the sampled DSSS signal multiplied by a complex conjugate copy thereof delayed by one chip interval, and is thus directly related to the LHS of equation (5) in the absence of noise.

The DP computation circuitry 250 includes optional input buffers 201, 202 for storing the I and Q samples, respectively, two delay elements 205 of delay size in for producing delayed sequences $I'=\{I(i-m)\}$ and $Q'=\{Q(i-m)\}$, two multipliers 210 for generating the products $\{Q(i)\cdot I(i-m)\}$ and $\{I(i)\cdot Q(i-m)\}$, and differential adder 215 with a differential port 217 for generating the first sequence of DP values $\{z(i)\}$ according to equation (9). A sequence of at least 2 mn consecutive DP values $\{z(i)\}$, with m elements per one chip interval of the spreading code, is then provided to a buffer 220, which may be in the form of a shift register. The buffer 220 has a size suitable for storing at least 2 mn, and preferably at least (2 mn+1) consecutive DP values $z(i)$. A selector 230 is further provided for selecting every $2m^{th}$ value stored in the buffer 220 starting with a selected starting position 221, so as to form the first sequence 122 $\{z(l)\}_n$ of n DP values $z(l)=z(i_1+2m\cdot(l-1))$, $l=1, \ldots, n$, wherein $i_1$ is the time index corresponding to the selected starting position 221 in the buffer 220. The first sequence 122 of n DP values obtained thereby is then provided to the decoder 130. The selector 230 maybe embodied as an m:1 down-sampler capable of down-sampling a data sequence starting with a selected position in the sequence.

In one embodiment, the decoder 130 is a soft input (SI) decoder, which processes the first sequence of n DP values $z(l)$ as a noisy codeword of the $(n,k_c)$ block code, with the DP values $z(l)$ providing corresponding reliability values. In this processing, the decoder 130 and the state computer 140 utilize known information about the structure of the SCG 5 and properties of the DP operation, as described hereinbelow.

Without loss of generality, we first assume that the n DP values 122 generated after selecting every $2m^{th}$ value from the buffer 220 is properly aligned with chips of the spreading code of the DSSS signal. If it is determined during further processing that that may not be the case, the processing described hereinbelow may be repeated after shifting the starting position $i_1$ 221 in the stored sequence by one or more samples, for example starting with sample position $(i_1+1)$.

In the absence of noise, the selected sequence $\{z(l)\}_n$ 122 of the n DP values has binary bipolar elements defined by the RHS of equation (7). A corresponding bit sequence y satisfies the following linear equation (10):

$$y=G\cdot x \qquad (10)$$

Here, the bit sequence y is a n×1 vector representing a codeword of the linear $(n, k_c)$ block code, G is an $n\times k_c$ matrix, and x is a $k_c\times 1$ state vector for the SCG 5 or an equivalent linear binary sequence generator, G and x have binary elements, and the arithmetic is over GF(2), n is the number of samples that the decoder 130 uses as the size of the codeword and $k_c$ is again the dimensionality of the SCG 5.

The matrix G, which will be referred to herein as the generator matrix, depends on a structure of the spreading generator 5, properties of the used DP operation, and the length of the codeword, n, that is used in decoding. The matrix G can be easily pre-computed and in some embodiments may be stored in memory associated with the decoder 130.

A parity check matrix H for the $(n, k_c)$ block code is any matrix that satisfies the following equation (11), wherein the arithmetic is again over GF(2):

$$H\cdot G=0 \qquad (11)$$

This parity check matrix H may also be pre-computed and stored in the decoder memory.

In the presence of noise, the selected sequence $\{z(l)\}_n$ 122 of the n DP values will be denoted hereinbelow as a vector v, and can be viewed as the bipolar representation of the codeword y that has been corrupted by noise during the transmission. The decoder 130 can utilize the noisy codeword v 122 received from the DPP 120 and constraints specified by the block code and the DP operation, for example as specified by the matrices H or G, to obtain an estimate of the codeword y 122 as known in the art of block decoding. Accordingly, an embodiment of the decoder 130 includes, or is operatively coupled to, a first memory 131 for storing elements of the pre-computed parity matrix H, or the pre-computed generator matrix G, for generating the codeword x from a sequence of n DP values forming the noisy codeword v 122.

Once the codeword estimate 122 is found by the decoder 130, it is passed to the state computer 140, which obtains therefrom an estimate 142 of the SCG state x, for example based on equation (10). An efficient way of doing this is by using a pseudo-inverse matrix, P#, which can be pre-computed based on G and stored in a second memory 141 associated with the state computer 140. The pseudo-inverse matrix P# may be computed by solving the following equation (12) for P#:

$$x = P\#G\cdot x. \qquad (12)$$

Using the pseudo-inverse matrix P#, the SCG state x can be found given a codeword, y, by matrix multiplication based on the following equation (13)

$$x = P\#y \qquad (13)$$

If the estimated codeword y 132 generated by the decoder 130 is correct, i.e. its elements $y_k$ in bipolar binary format are given by the RHS of equation (7), then the vector x computed by the state computer 140 represents the correct SCG state for a segment of the received DSSS signal corresponding to the selected sequence $\{z(l)\}_n$ 122. In this case, the estimated SCG state x is accepted and may be provided as the output 142 of the SAP 125, for example for de-spreading of the received DSSS signal. In some embodiments, successful code acquisition can be signaled to a user.

Figure 4:
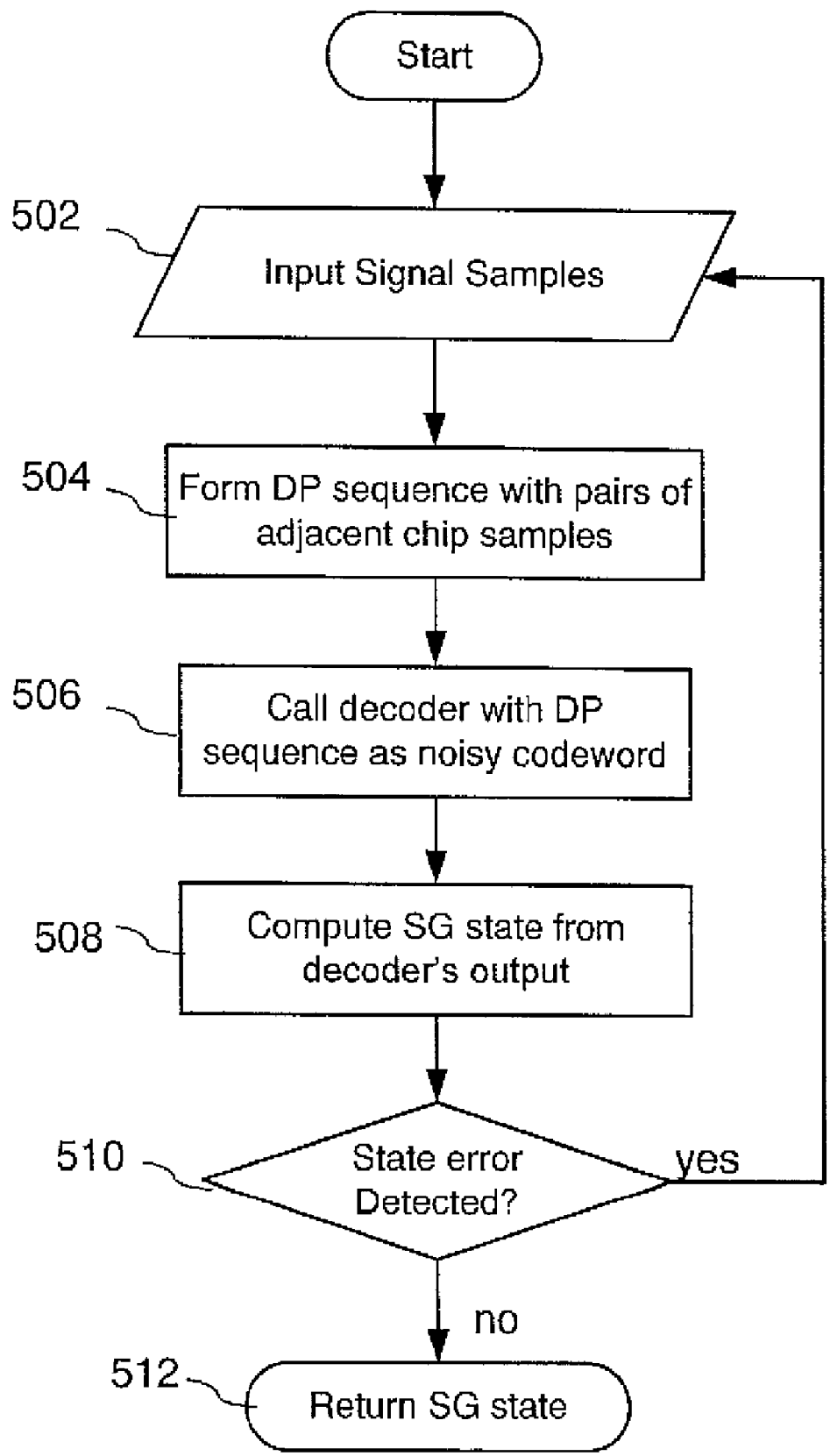
FIG. 4 is a flowchart of a method for acquiring the state of a spreading code generator according to an embodiment of the present invention.

Referring now to FIG. 4, an embodiment of the method of the present invention for acquiring the SCG state from a DSSS signal may include the following steps. The method may be implemented by the SAP 125 in association with a state error detector as described hereinbelow, and may be applied, for example, to DSSS signals generated according to various DS-CDMA standards, including but not limited to the wireless cellular standards CDMA 1x, CDMA2000, and WCDMA.

The processing starts with step 502, wherein a complex sampled DSSS signal at a rate of 1 sample/chip, or a multiple m thereof, is obtained.

Next, in step 504 sequential pairs of signal samples I(i), I(i+m), Q(i) and Q(i+m) from adjacent chips are used to form a new sequence of 2n DP values z(i), from which every second sample is selected starting with a selected first sample position. The resulting candidate sequence of n DP samples $v_1$ may correspond to a codeword for an $(n, k_c)$ linear block code. It is also possible that a sequence starting at the next first sample position has a correct timing and thus would correspond to the desired codeword. Alternatively, a candidate sequence of n DP samples potentially corresponding to a codeword may be obtained directly by computing a single DP value from I and Q signal samples corresponding to every non-overlapping pair of adjacent chip intervals, resulting in n DP values for a length of the sampled DSSS signal containing 2n chip intervals of the spreading code.

In step 506, the candidate sequence of n DP values is provided to a soft-input (SI) decoder 130 for the linear block code as the noisy 'codeword'.

In step 508, the decoder outputs the decision bits for the codeword, and the state computer 140 computes the SCG state estimate from the codeword. By way of example, for CDMA 1x signals, a pre-computed 72×72 pseudo-inverse matrix may be used to compute the initial shift register states $x_1$, $x_2$ for the CDMA 1x spreading generator based on 72 contiguous bits from the candidate codeword.

In step 510, the computed SCG state estimate is checked for validity using a pre-defined criterion or method; by way of example, in a CDMA 1x application candidate states of I and Q short shift registers of the SCG 5 are checked using a lookup table to verify that the two states form a valid pair, as described hereinbelow more in detail. If the criterion is satisfied, the estimated thereby state is highly likely to be the correct state of the spreading generator used to generate the spreading sequence for the signal, and may be accepted as such forming the output of the method, and/or passed for further processing. Also, the state validity may be verified by testing if it results in successful de-spreading of the received DSSS signal. If the state validity criterion is not satisfied, the processing steps 504-510 are repeated, such as by forming and decoding a DP sequence starting with a next signal sample.

In some embodiments, for example wherein a correct timing of the candidate sequence of n DP values with respect to the spreading code is ensured by other means, the state validation step 510 may be omitted.

Figure 5:
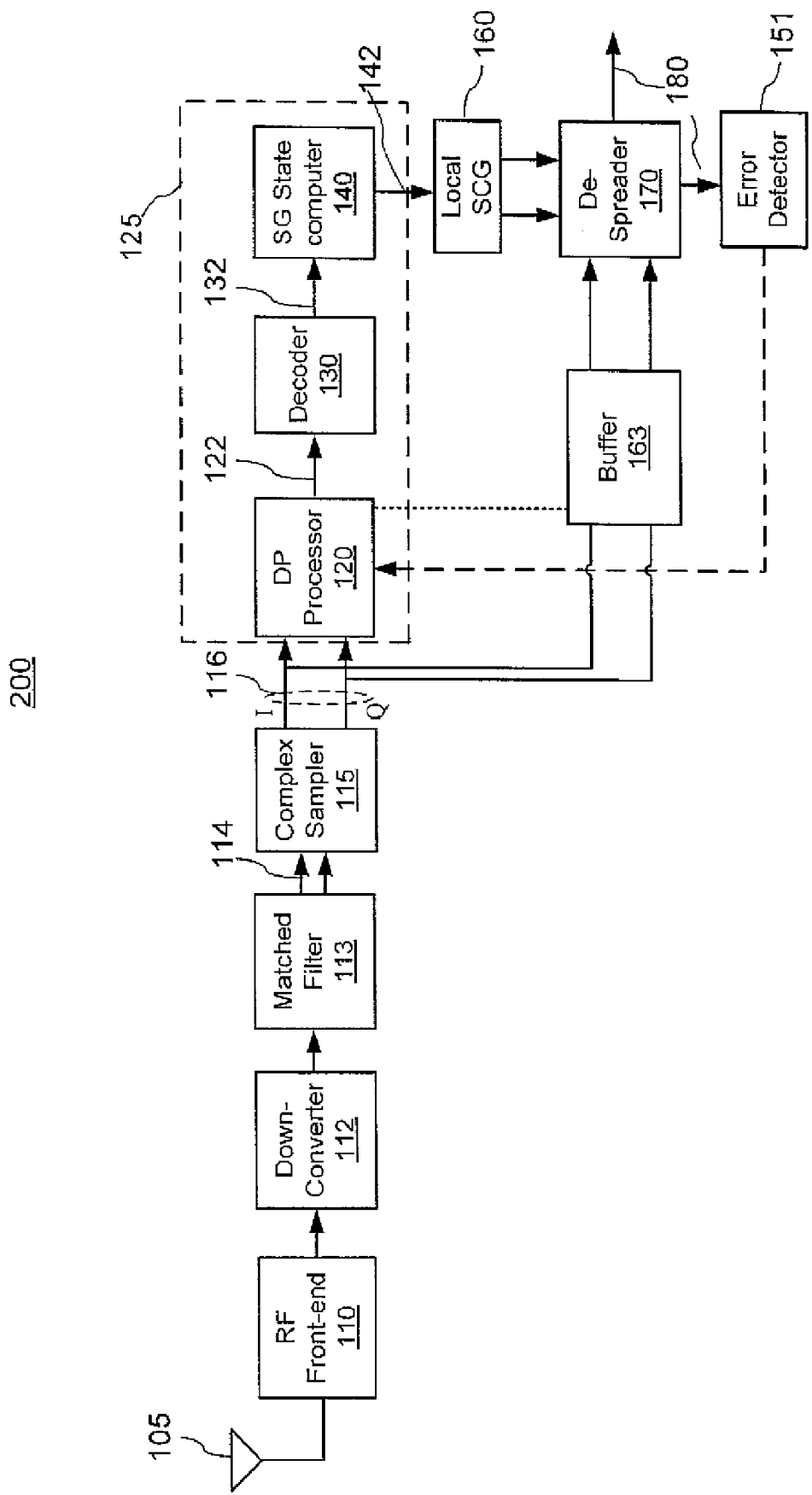
FIG. 5 is a block diagram of the apparatus for acquiring the state of a spreading code generator that includes an error detector for detecting de-spreading failures.

Referring now to FIG. 5, there is shown an apparatus 200 for acquiring a state of the spreading generator from a received DSSS signal according to an embodiment of the present invention. The apparatus 200 includes many of the same functional blocks as the apparatus 100, which are denoted using same reference numerals and will not be further described. In addition, the apparatus 200 further includes a buffer 163 for storing the sampled complex DSSS signal r̂ 116, which is operatively coupled to a de-spreader 170, which also couples to an output of a local SCG 160, which is a copy of the transmitter SCG 5, or an equivalent thereof, and may also coupled to the DP processor 120 which provides timing. An input of the local SCG 160 is coupled to the output of the SAP 125, which provides thereto the ESG state estimate 142 computed by the state computer 140. In response, the local SCG 160 generates a local copy of the complex spreading code, which is then provided to the de-spreader 170 for de-spreading the sampled DSSS signal obtained from the buffer 163. A resulting de-spread signal 180 may then be output for further processing and/or for communicating to a user.

However, if the estimated codeword y generated by the decoder 130 is incorrect, it will result in an incorrect SCG state estimate x 142. In this case, the de-spreading operation will be unsuccessful, i.e. will not result in the reconstruction of the narrower-bandwidth data signal, which may be detected at the output of the de-spreader 170 using an error detector 151. In various embodiment, the error detector 151 may utilize different approaches to detect unsuccessful de-spreading, for example by estimating a bandwidth of the signal 180 and comparing it to a pre-defined threshold. The error detector 151 in cooperation with the blocks 163, 160 and 170 function as a state validator, as it validates SCG states generated by the SAP 125 against a pre-determined criterion.

Figure 6:
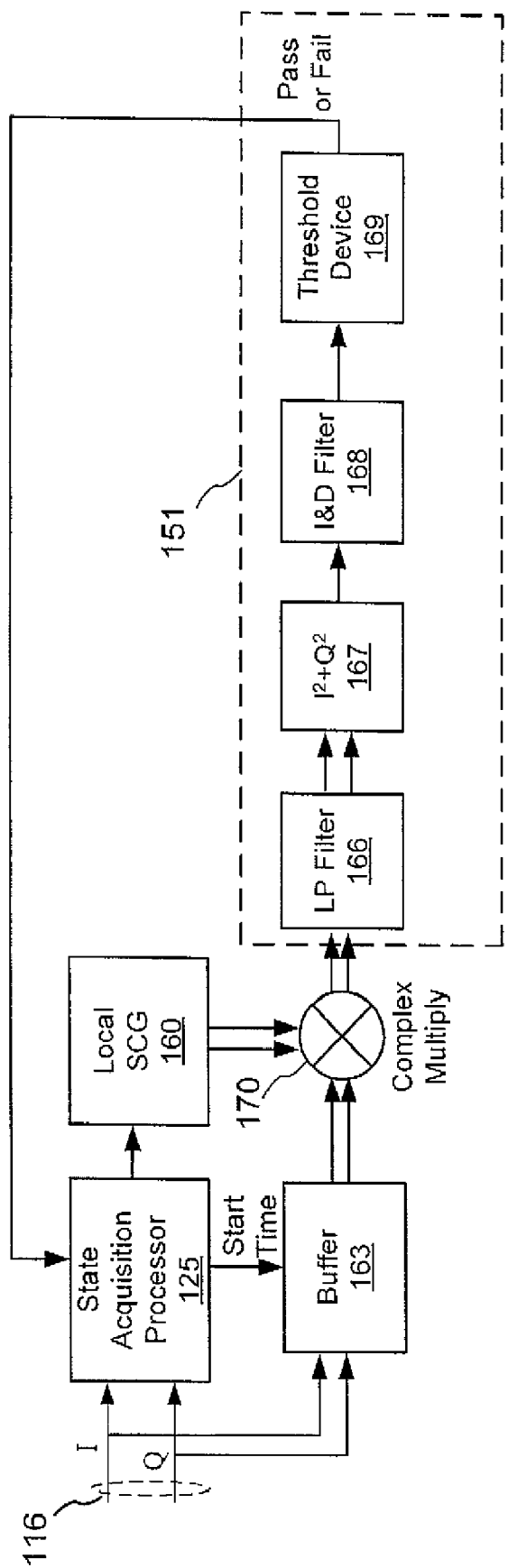
FIG. 6 is a block diagram of a portion of the apparatus of FIG. 5 illustrating an embodiment of the error detector.

With reference to FIG. 6, there is illustrated one possible implementation of the error detector 151 according to an embodiment of the invention. In this embodiment, the error decoder 151 includes an LP filter 166, a square-law detector 167, an integrate and dump (I&D) filter 168, and a threshold device 169 connected in series. Operation of this circuit is described, for example, in Section 1.2 of Simon et al. Spread Spectrum Communications, Vol III, Computer Science Press, Maryland, 1985. Briefly, an SCG state estimate generated by the SAP 125 based on the I and Q signals 116 is loaded into the local SCG 160 for generating a candidate spreading code. This spreading code is provided to the de-spreader 170 for de-spreading copies of the I and Q signals 116 that are stored in the storage buffer 163. The SAP 125 provides the start time to the buffer 163 to start outputting I and Q samples for the multiplication with the spreading code. A sequence of signal samples resulting from this de-spreading operation is low pass filtered by the LPF 166. The magnitude of the samples of the low pass filtered signal is computed by the square law detector 167 and then integrated by the I&D filter 168. The output of the I&D filter 168 is compared with a threshold in the threshold device 169. If the threshold is exceeded, the estimated SCG state that was used to produce the de-spreading sequence is accepted as correct; otherwise a signal is sent to the SAP 125 for generating a new SCG state estimate. A large value out of the I&D filter 168 means that a large amount of the signal energy is passed though the LP filter 166, indicating that the signal from the de-spreader 170 is narrowband, the de-spreading was successful. A small value at the output of the I&D filter 168 means that only a small amount of energy passed through the LP filter 166, indicating a wideband signal at the output of the de-spreader 170, and thus unsuccessful de-spreading.

Figure 8:
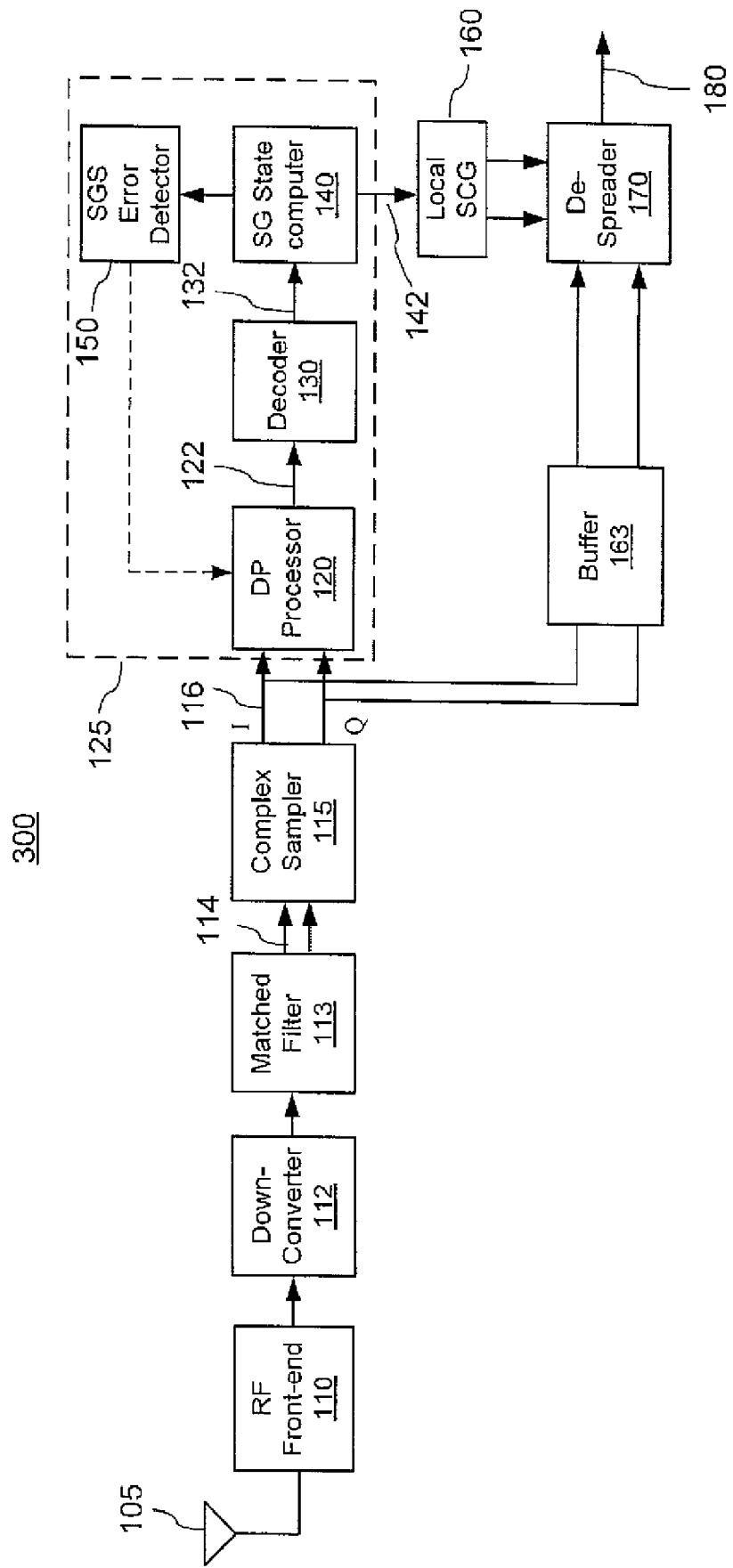
FIG. 8 is a block diagram of the apparatus for acquiring the state of a spreading code generator that includes a state error detector coupled to a state processor for detecting invalid states.

With reference to FIG. 8, there is shown an apparatus 300 for acquiring a state of the spreading generator from a received DSSS signal according to an embodiment of the present invention. The apparatus 300 includes many of the same functional blocks as the apparatuses 100 and 200, which are denoted using same reference numerals and will not be further described. In addition, the apparatus 300 further includes a state error detector (SED) 150, which in this embodiment may be coupled directly to the state computer 140. The SED 150 utilizes a predetermined criterion to validate candidate SCG states generated by the SCG state computer 140, and thus can also be referred to herein as the state validator or the SCG state validator.

In one embodiment, the first SCG state estimate 142 is validated by verifying its compatibility with a second SCG state estimate, which is generated by the SAP 125 based on a different segment of the sampled DSSS signal 116 than the segment used to generate the first SCG state estimate.

Figure 7:
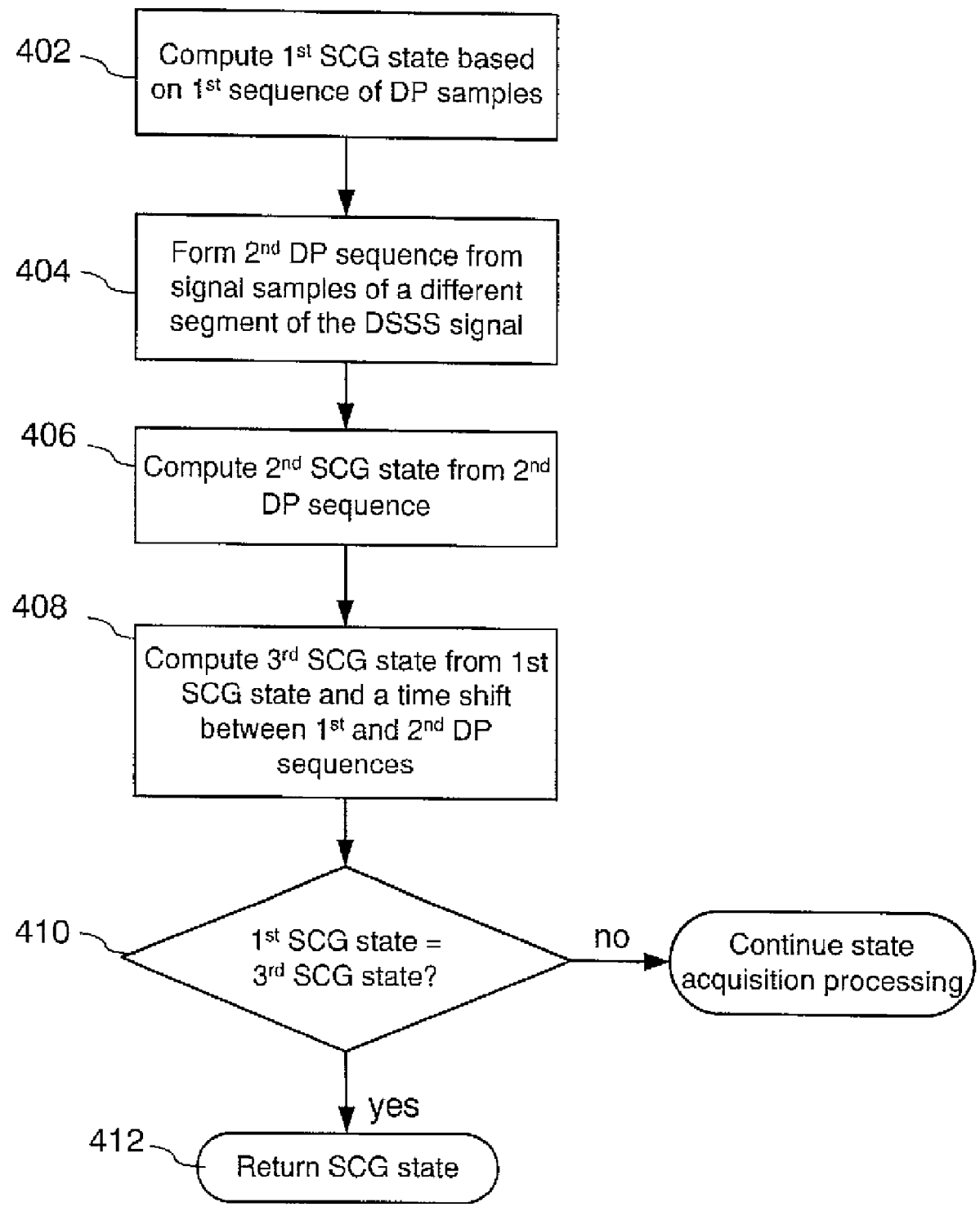
FIG. 7 is a flowchart of a method for validating the acquired state according to an embodiment of the invention.

A flowchart illustrating method steps involved in the SCG state validation according to this embodiment of the invention is shown in FIG. 7. In step 402, the SAP 125, working on a selected block of I and Q samples of the DSSS signal 116 starting at a time instance 0, generates the first sequence $v_1$ of n DP values, decodes it, and computes the $1^{st}$ candidate SCG state x, denoted here as $x^1$, as described hereinabove. In step 404, the DP processor 120 forms a second sequence $v_2$ of n DP values from I and Q signal samples of a different block of the DSSS signal. The second sequence $v_2$ is shifted in time with respect to the first sequence $v_1$ by a time shift of M chip intervals, wherein M>1. In step 406, $v_2$ is provided to the decoder 130 to obtain a second codeword $y_2$, based on which the state computer 140 computes a second candidate SCG state $x^2$.

In step 408, a third SCG state $x^M$ is computed from the first SCG state $v_1$ based on the time delay M. This can be done, for example, either algebraically using the known structure of the SCG 5, or by loading a local spreading code generator with the first state $x^1$ and running it by M times. By either of these methods, the first candidate state $x^1$ can be used to generate the projected state $x^M$. In step 410, this state is compared with $x_2$. If $x^M = x^2$, then states $x^1$ and $x^2$ are considered correct, and either one of these candidate states is accepted as the correct SCG state.

In this embodiment, the SED 150 may include memory for storing the candidate SCG states, a processing logic for generating the third SCG state based on the first candidate SCG state and the known time delay M, and an SCG state comparator.

In another embodiment, the SED 150 validates the first candidate SCG state vector x generated by the state computer 140 by analyzing its structure, for example by analyzing whether components of the SCG state vector x that correspond to states of the first and second constituent spreading generators of the transmitter SCG form a valid state combination.

In one embodiment, the state computer 140 may separately generate states of constituent spreading generators of the transmitter SCG based on the current codeword estimate, and then check if these states satisfy a pre-determined relationship. In one embodiment, the SED 150 may include a look-up table, which stores all valid combinations of states of the constituent spreading generators, so that incorrect state pairs may be recognized.

By way of example, embodiments of the present invention will now be described in application to blind SCG state acquisition of DSSS signals generated using the CDMA 1x standard, which is a commonly used standard for cellular communications. A CDMA 1x signal occupies 1.25 MHz of bandwidth.

Figure 9:
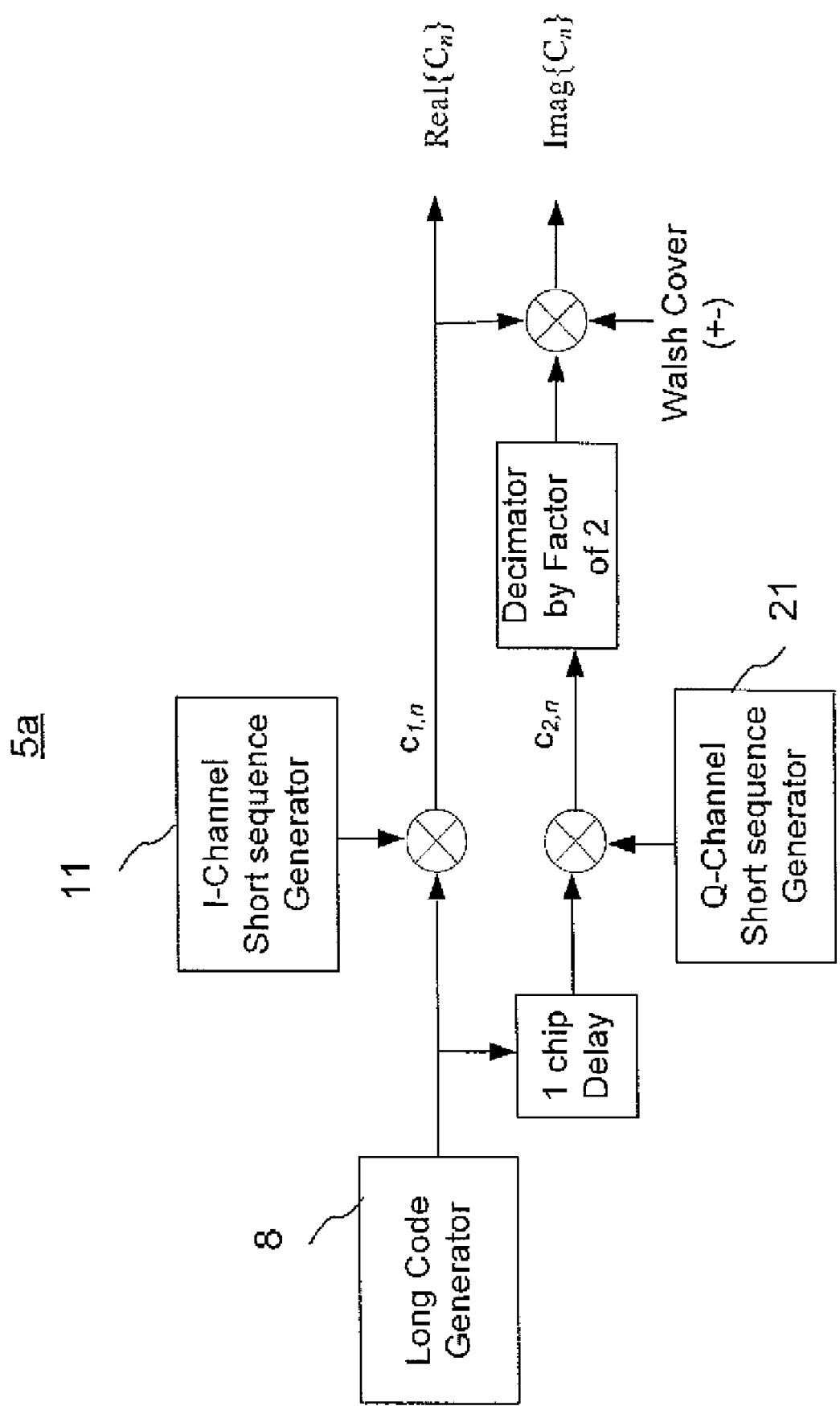
FIG. 9 is a block diagram of a spreading code generator with a single long code generator according to the CDMA 1x standard.

FIG. 9 illustrates a block diagram of a spreading generator 5a that is commonly used in CDMA 1x transmitters for generating CDMA 1x signals. The complex spreading code is generated from two constituent binary codes $c_{1,i}$ and $c_{2,i}$ as shown in FIG. 1.

Figure 10:
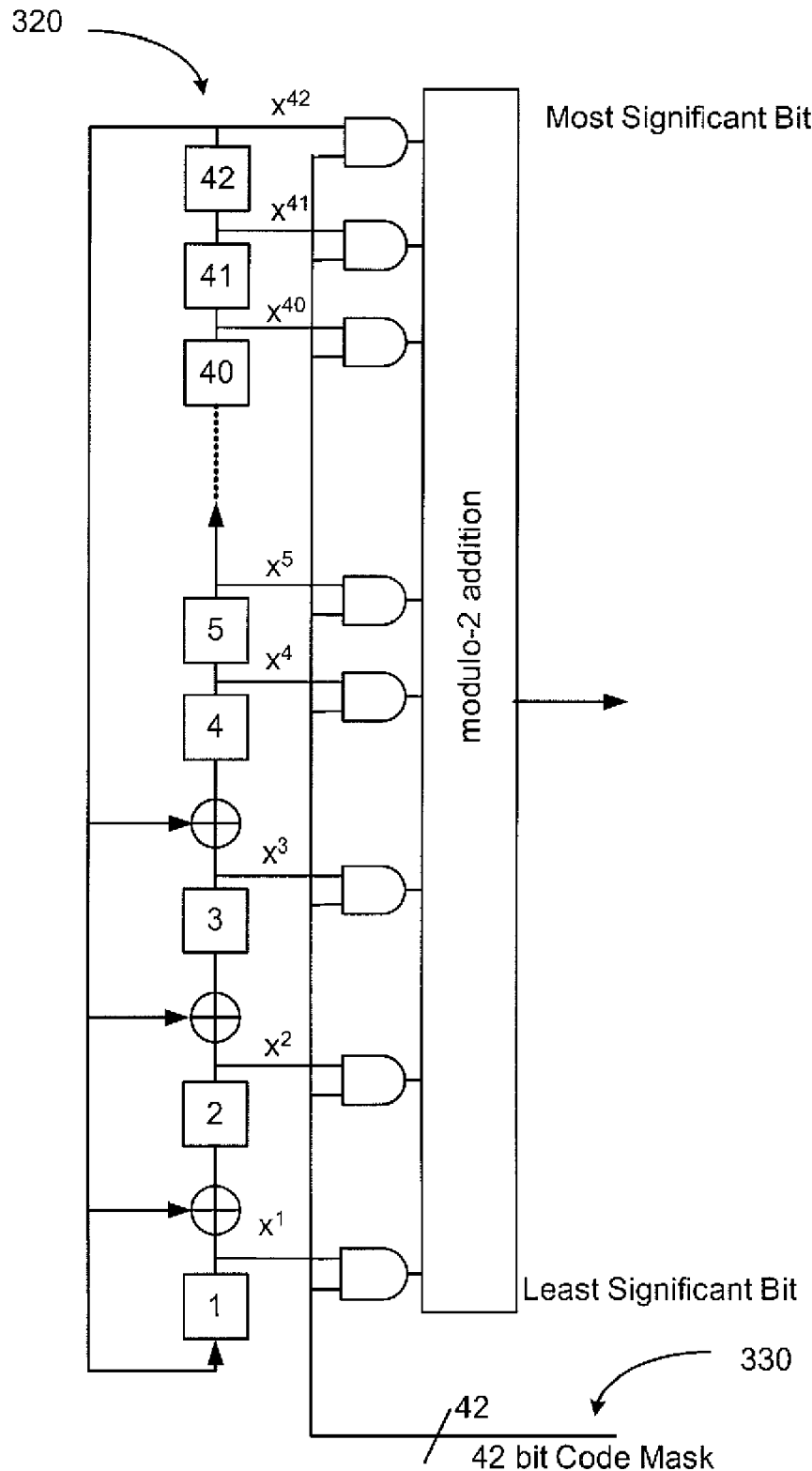
FIG. 10 is a block diagram of a masked linear feedback shift register for the long spreading code generator for CMDA 2000 1x standard.

Generally, the dimensionality of a spreading code generator, $k_c$, is the sum of the dimension of the distinct linear systems that form the two spreading codes $c_1$ and $c_2$. By way of example, we will now consider the sequences $c_1$ and $c_2$ generated by three linear systems, such as the I and Q channel short code generators 11, 21 and a long code generator 8. We will denote the number of state elements, or dimension of each component linear system 8, 11, and 12 as $n_0$, $n_1$, and $n_2$, respectively. Thus, the number $k_c$ of state elements of the SCG 5a that are required to generate $c_1$ and $c_2$, will be the sum of the $n_0$, $n_1$, and $n_2$.: $k_c = (n_0 + n_1 + n_2)$. In the CDMA 1x, these spreading code generators are implemented using LFSRs. A block scheme of the LFSR used as the long code generator 8 is illustrated in FIG. 10. According to notations used herein, the first spreading code $c_1$ is generated by the two linear systems denoted '0', and '1', e.g. LFSRs 8 and 11, while the second spreading code $c_2$ is generated as by the two linear systems denoted as '0' and '2', e.g. LFSRs 8 and 12. The combination of the LFSRs 8 and 11 for generating the first spreading code $c_1$ is referred to herein also as the first constituent spreading generator, while the combination of the LFSRs 8 and 12 for generating the second spreading code $c_2$ is referred to herein also as the second constituent spreading generator, with the two spreading codes $c_1$ and $c_2$ referred to as the first and second constituent spreading codes.

The generator matrix G, and a corresponding parity matrix H for the $(n, k_c)$ block code according to the present invention, can be pre-computed for the CDMA 1x signals as follows.

The first and second spreading codes are defined by states of the respective linear systems at a particular moment in time in accordance with matrix equations 14 and 15 as known in the art. The codeword y with elements defined by the product in the RHS of equation (7) can be generated by linear combinations of the '0', '1', and '2' linear systems. The puncturing by 2 operation in the LFSR 8 is accomplished by modifying the index of the elements of the products that remain unpunctured.

$$c_1 = \begin{bmatrix} b_0 & b_1 \\ b_0 A_0 & b_1 A_1 \\ M & M \\ b_0 A_0^{2m} & b_1 A_1^{2m} \end{bmatrix} \begin{bmatrix} x_{0,0} \\ x_{1,0} \end{bmatrix} \quad (14)$$

and $$c_2 = \begin{bmatrix} b_3 & b_2 \\ b_3 A_0 & b_2 A_2 \\ M & M \\ b_3 A_0^{2m} & b_2 A_2^{2m} \end{bmatrix} \begin{bmatrix} x_{0,0} \\ x_{2,0} \end{bmatrix} \quad (15)$$

where b is the observation vector which forms an output value that is a linear combination of the state x, A is the transition matrix for the respective linear system that is defined by equation (16) and relates the state $x_{j,k}$ for a $j^{th}$ linear system at time k to its state at time k+1:

$$x_{j,k+1} = A_j x_{j,k} \quad (16)$$

wherein $x_{j,0}$ is the state of the $j^{th}$ linear system at time 0, and j=0, 1, or 2.

Using equations (14) and (15), the generator matrix G for the codeword y with elements defined by the RHS of equation (7) can be computed, and may be expressed in the form defined by equation (17):

$$G = \begin{bmatrix} b_0 \oplus b_0 A_0 \oplus b_3 & b_1 \oplus b_1 A_1 & b_2 \\ b_0 A_0^2 \oplus b_0 A_0^3 \oplus b_3 A_0^2 & b_1 A_1^2 \oplus b_1 A_1^3 & b_2 A_2^2 \\ M & M & M \\ b_0 A_0^{2m-2} \oplus b_0 A_0^{2m-1} \oplus b_3 A_0^{2m-2} & b_1 A_1^{2m-2} \oplus b_1 A_1^{2m-1} & b_2 A_2^{2m-2} \end{bmatrix} \quad (17)$$

where $\oplus$ denotes binary addition. This generator matrix relates the codeword y to the state $x_0$ of the SCG 5b at time 0 as defined by equation (10) with $x = x_0$; here, the state $x_0$ is defined by the following equation:

$$x_0 \ni [x_{0,0} x_{1,0} x_{2,0}]^T. \quad (18)$$

Accordingly, y can be viewed as a codeword of a binary linear code with codeword length of n and a number of information bits $k_c$ equal to $n_0 + n_1 + n_2$.

Once the generator matrix G is computed, the parity check matrix H and the pseudo-inverse matrix $P^{\#}$ can be found based on equation (11) and (12). The constraints in the generator matrix or parity check matrix can be used in the decoding algorithm implemented in the decoder 130 to generate an estimate of the codeword y from the received noisy sequence v.

According to the CDMA 1x standard, the I-channel and Q-channel short sequence generators 11, 21 are embodied using LFSRs with the generator polynomials given by $$g(x) = x^{15} + x^{13} + x^9 + x^8 + x^7 + x^5 + 1, \quad (19)$$

and $$g(x) = x^{15} + x^{12} + x^{11} + x^{10} + x^6 + x^5 + x^4 + x^3 + 1, \quad (20)$$

respectively. The long sequence generator 8 has a generator polynomial of $$g(x) = x^{42} + x^{35} + x^{31} + x^{27} + x^{26} + x^{25} + x^{22} + x^{21} + x^{19} + x^{18} + x^{17} + x^{16} + x^{10} + x^7 + x^6 + x^5 + x^3 + x^2 + x + 1 \quad (21)$$

The generator polynomials in equations (19)-(21) are used to define transition matrices for the three sequence generators 11, 21, and 8.

The spreading generator 8 commonly utilizes a masked shift register. In the CDMA 1x system, the state of the shift register is known and the unique channel mask adds contributions from the various delays within the shift register. This combining of delays within the register forms a spreading sequence that is a delayed version of the spreading sequence from the same register. Thus, it is possible to solve for the initial state of the equivalent LFSR, i.e., without the mask, as it will produce the delayed version of the spreading code and this is the spreading sequence that is required for dispreading of the signal.

The embodiments of the method and apparatus for acquiring the state of the spreading generator from a DSSS signal that have been described hereinabove are applicable equally well to DSSS signals generated using two long code generators, such as in accordance with one of the CDMA2000 standards.

Figure 11:
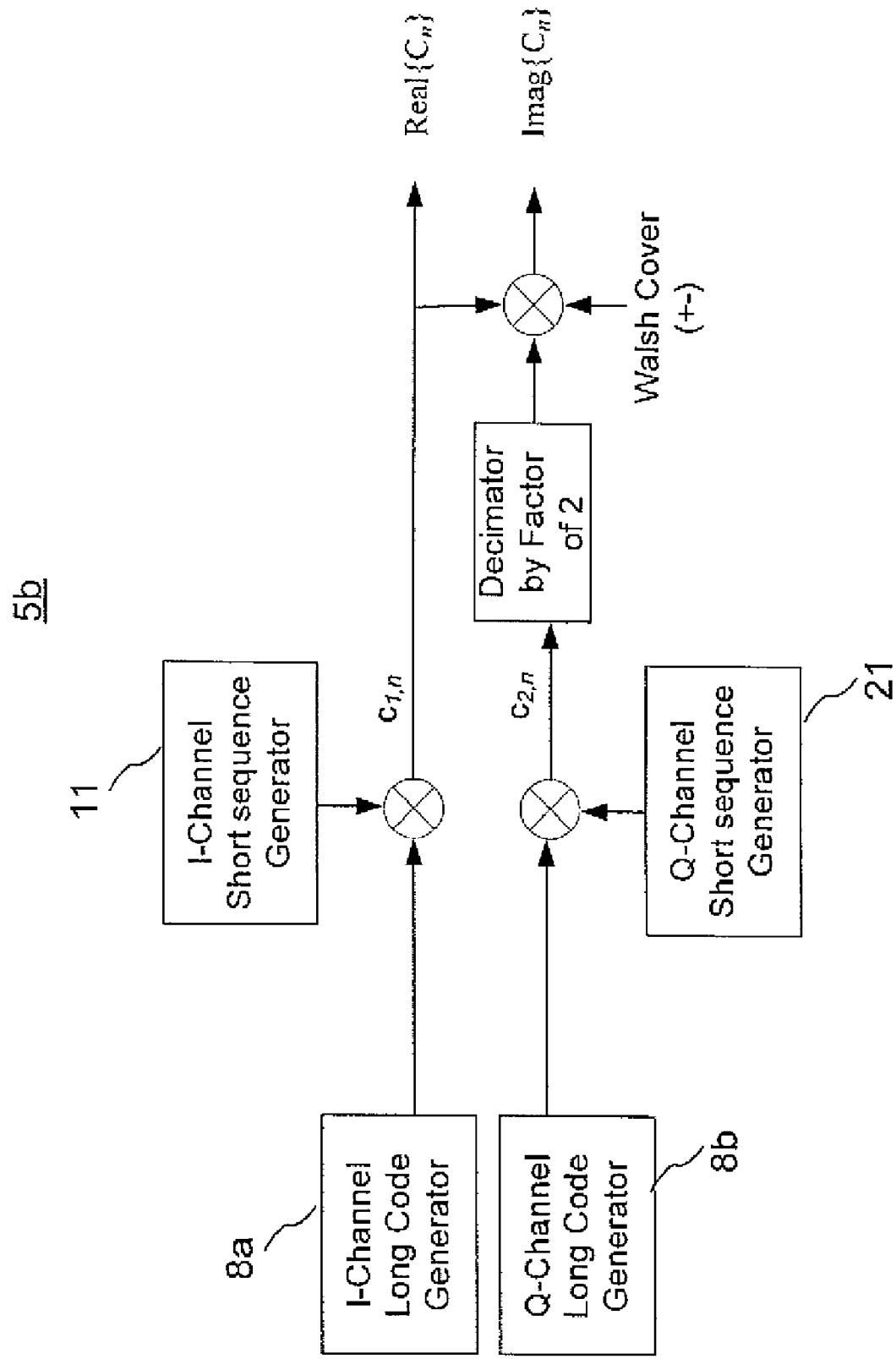
FIG. 11 is a block diagram of a spreading code generator with two long code generators according to the CDMA 2000 1x standard.

FIG. 11 shows a block diagram of the spreading generator 5b according to a CDMA 2000 standard. The two long code generators 8a and 8b, which may be the same as the long code generator 8 of the CDMA 1x system shown in FIG. 10, are used separately for the I-channel and the Q-channel. This is accomplished by having a different mask 330 for each channel. The two generators 8a, 8b will output different offsets in the sequence and thus will have different states of the equivalent LFSRs. The state x of the SCG 5b is 114 bits long, i.e., 42 bits for each long register 8a, 8b and 15 for each short register 11, 21, as opposed to 72 bits for the CDMA 1x system of FIG. 9, which is formed of 42 bits for the long spreading generator 8, and 15 for each short spreading generator 11, 21. [0]

Turning back to FIG. 8, the states of the I and Q short spreading generators 11, 21, with 15 delay registers in each, can be used to verify if the current estimated codeword y has a high probability of yielding a valid state. In one embodiment, the SED 150 may implement a method of verification that is based on an observation that the first and second constituent spreading sequences have a known state at the beginning of each frame and are clocked simultaneously. This ensures that for every state of one of the short spreading generator 11, 21 there will be a unique state for the other of the spreading generators 11, 21. In other words, there are valid pairs of states for each clocking of the short spreading generators 11, 21. This property can be used to provide a fast method of verifying whether the estimated codeword is likely to be correct.

In one embodiment, this can be accomplished using the following steps. A first estimate of the SCG state x of the SCG 5b is computed by the state computer 140 based on the codeword y using equation (13). Next, states of the I and Q short spreading generators 11, 21 are determined from the first estimate of SCG state x, such as based on equation (22):

$$x = [x_0 x_1 x_2]^T, \quad (22)$$

where the vectors $x_0$, $x_1$, and $x_2$, represent the states of the long shift register 8, and the I and the Q short shift registers 11 and, 21, respectively.

The state computer 140 therefore computes the states $x_1$, and $x_2$ for the I and Q short spreading generators 11, 21 based on the codeword y. If needed for efficiency, the states of only the I and Q short spreading generators can be computed using a sub-matrix of $P^{\#}$.

A look-up table stored in memory that is associated with the state computer 140 or with the decoder 130 can be used to determine if the solved states of the I and Q short shift registers are a valid pair. For example, in one embodiment states of the I shift register can be used as an index into a table that contains the corresponding states of the Q shift register, or vice versa. The state $x_1$ for the I shift register that is obtained by the state computer 140 based on the candidate codeword y may then be used to look-up in the look-up table a corresponding state of the Q shift register, $\hat{x}_2$. If the state $x_2$ for the Q shift register that was obtained based on the candidate codeword y matches the Q state $\hat{x}_2$ found from the look-up table, it is highly probable that the solved state for the shift registers are correct, and the combined SCG state x is provided as the output. If the two states $x_2$ and $\hat{x}_2$ do not match, the estimated codeword sequence y contains an error and thus the solved state x is not the valid state of the spreading generator 5a or 5b.

In a DSSS system based on the CDMA 1x standard, the decoding based on the generation matrix given by equation (17) or on a corresponding parity matrix, may not work for all starting positions $t_1$ of the first sequence v of n DP values that is provided to the decoder 130. Indeed, spreading codes generated by the short shift registers defined by equations (19) and (20) have a period of 32767. The period of the short spreading sequences in the CDMA 1x system is 32768 chips. This period is achieved by adding an extra zero to the run of 14 consecutive zeros. The spreading codes $c_1$, $c_2$ generated by the short spreading generators 11, 21 are aligned such that at the start of the frame, the state of these spreading generators is the state that outputs a '1' after the 15 consecutive zeros.

The extra zero has not been taken into account in equation (17). Thus, the parity check matrix based on this equation will not be valid for the case when the extra zero is contained within the signal samples from which the noisy codeword 122 comprised of the n DP values is formed. Accordingly, the decoder 130 may fail to generate a correct codeword for sequences of signal samples that contain the start of the frame. This is not a significant problem as the block size n for the decoder 130 is much smaller than the period of the frame for the CDMA 1x system. By way of example, consider a codeword size for the decoder to be 1024, requiring 2048 signal samples, one sample per chip. Since one CDMA 1x frame contains 32768 chips, there are (32768−2048)=30720 starting positions within each frame where the decoding is possible. Furthermore, the decoding can succeed if the start of the frame is near the end of the decoding block as the number of errors due to not considering the extra bit in the parity equations will be small. If the codeword corresponding to a selected signal sequence is found to be invalid, the processing may be repeated for a sequence of DSSS signal samples starting with a next sample.

Generally, it will be appreciated that the decoder 130 may be any decoder that is capable of operating on the code defined by the spreading generator structure. The decoder 130 may be a hard input decoder when preceded by a decision device, or a soft input (SI) decoder. Preferably, the decoder 130 is an SI block decoder, and can be implemented using any suitable iterative or non-iterative algorithm for soft input decoding of linear block codes.

In one embodiment, the decoder 130 utilizes an iterative Vector SISO decoding algorithm to generate the codeword y from a sequence v of n DP values. The basic steps of this decoding algorithm are described in U.S. Pat. No. 720,389 "Soft input decoding of linear codes", which is incorporated herein by reference. An embodiment of this algorithm described in an article R. Kerr and J. Lodge, "Near ML Performance for Linear Block Codes Using an Iterative Vector SISO Decoder," 4th International Symposium on Turbo Codes Munich, Germany, April 2006, which is also incorporated herein by reference, was used to produce simulation results shown in FIGS. 13 to 15.

In the simulations, the maximum number of bias modifications was set to 20 and a scale factor of 0.5 was used. The codeword was modified and decoding continued, if after solving for the initial state of the shift registers a valid pair for the short shift registers did not occur. A maximum of 50 iterations were allowed for each decoding. In the simulations, a minimum of 10000 codewords were simulated. Once the minimum number of codewords were simulated, the simulation stopped when a minimum of 200 codeword errors were observed.

Figure 12:
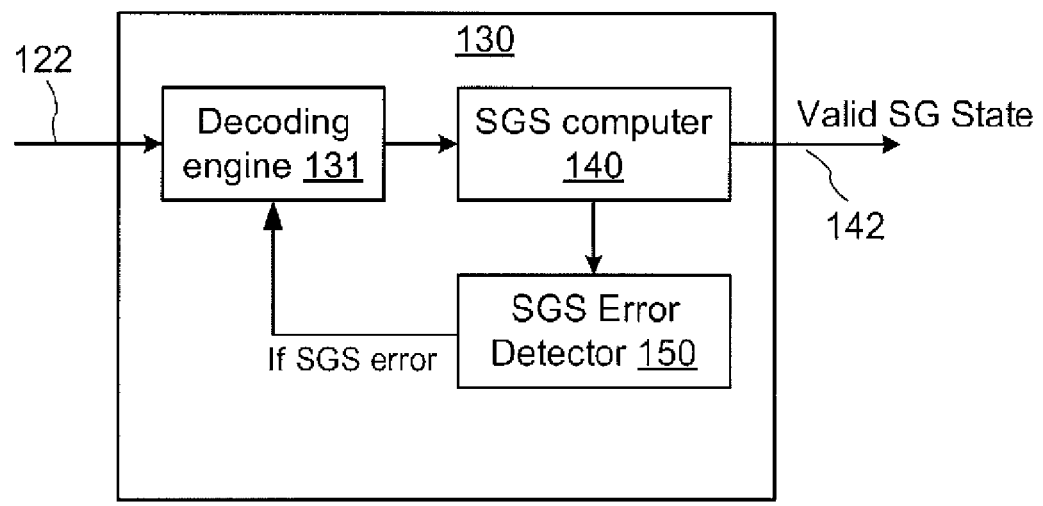
FIG. 12 is a schematic block diagram of an iterative decoder used in the apparatus for acquiring the state of a spreading code generator according to an embodiment of the invention.

In the original Vector SISO decoding algorithm, a normalized metric was used to determine if the candidate codeword is likely to be correct. For the present simulations, the codeword verification criteria was modified to utilize the knowledge of the structure of the I and Q short shift registers as described hereinabove. In this embodiment, the decoder 130 may be considered to incorporate the state computer 140 and the state error detector 150, in addition to a decoding engine 131 that performs the processing associated with each decoding iteration, as illustrated in FIG. 12. The state computer 140 computes the I and Q short shift register states based on a current candidate codeword, which are then passed onto the state error detector 150; the state error detector 150 tests whether they form a valid pair; if they do, the candidate codeword is accepted and the decoder exits outputting a valid SCG state 142, otherwise the candidate codeword is rejected and the decoder continues its iterations, until either a satisfactory codeword is found or a limit on the number iterations or biasings is reached.

Figure 13:
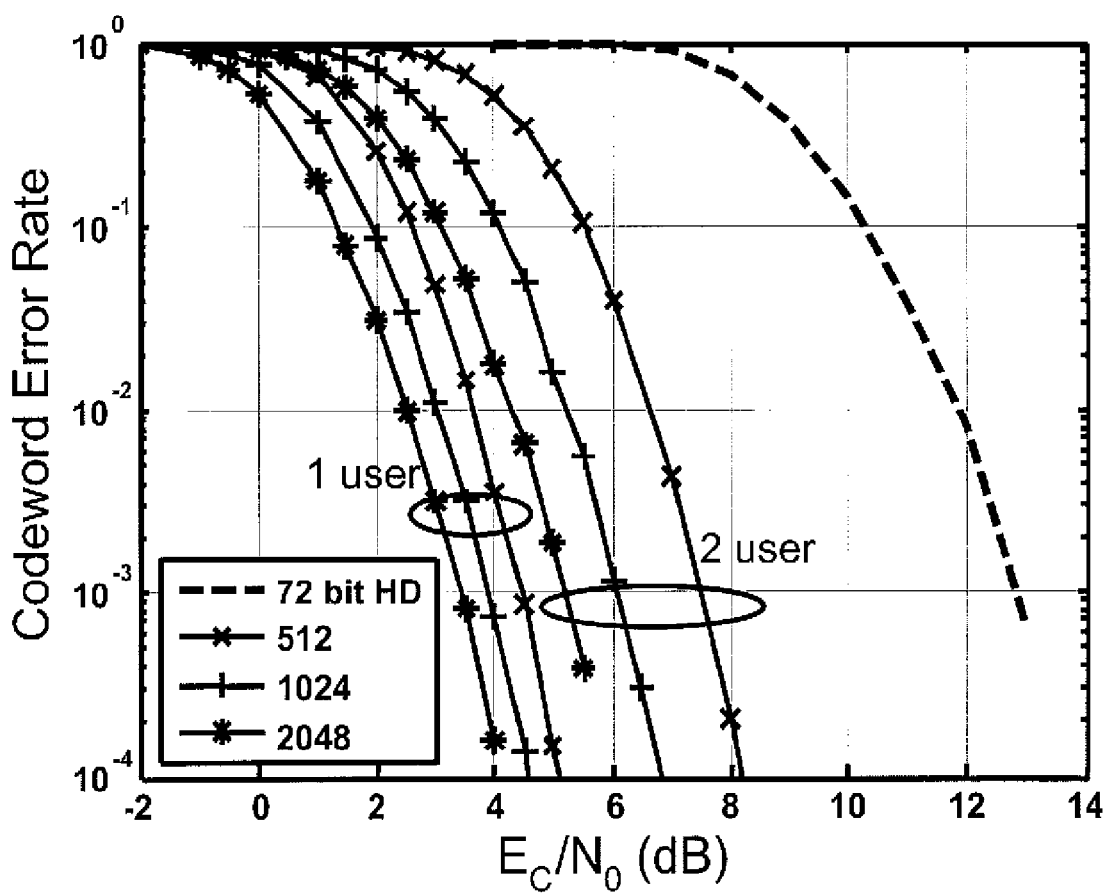
FIG. 13 is a graph showing simulated codeword error rate performance results for the apparatus of FIG. 2 using codeword lengths n of 512, 1024, and 2048 for 1 and 2 users on an AWGN channel.

FIG. 13 shows computed codeword error rates (CER) for codeword lengths of 512, 1024, and 2048 1 and 2 user cases on an AWGN channel. For the 2 user case, the interfering user has random frequency and phase offsets relative to the desired user and the power is set to −0.9 dB, i.e. less than 1 dB difference, relative to the desired user. The codeword is marked in error if it does not agree with the state of the desired user's signal. As seen in FIG. 13, by increasing the block length of the code from 512 to 2048, improvements in performance of 1.1 dB and 2.3 dB for the 1 and 2 user cases, respectively are obtained at a CER of $10^{-2}$. There is a degradation in performance for the case when there is an interfering user. For the two user case, the CER performance is degraded from the 1 user case by 3 dB, 2.2 dB and 2.2 dB for block sizes of 512, 1024 and 2048, respectively. The CER performance of a hard decision decoder that makes hard decisions on the sequence of bits and solves for the state of the spreading generator is provided for comparison. The performance is for the single user on the AWGN channel. The decoder has no coding gain when using 72 bits.

The results presented in FIG. 13 represent the error performance when a codeword is aligned with the decoder.

As shown in the figure, the CER improves for longer observation length in terms of codeword error rate versus the $E_c/N_0$ (Chip energy versus noise ratio).

Figure 14:
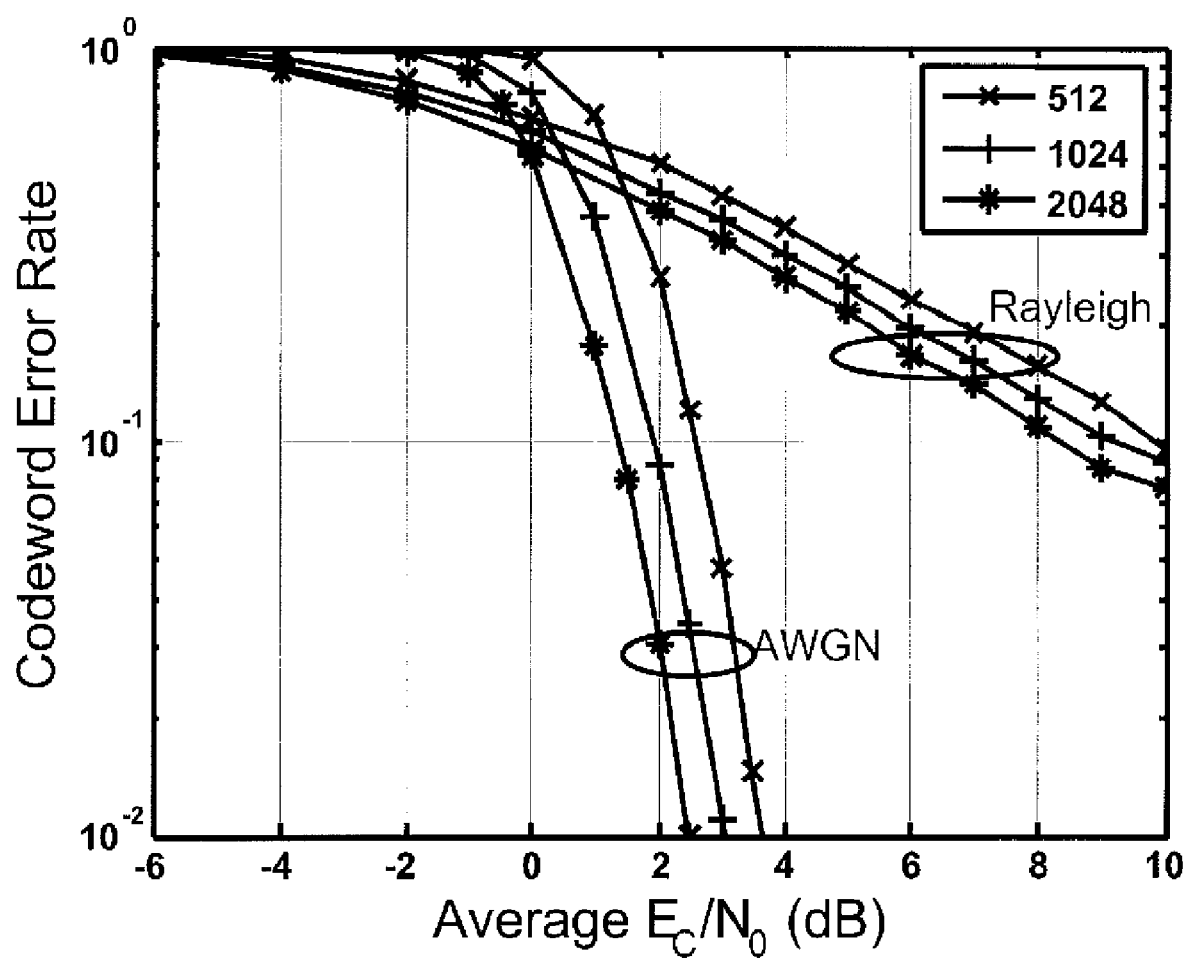
FIG. 14 is a graph showing simulated codeword error rate performance results for the apparatus of FIG. 2 using codeword lengths n of 512, 1024, and 2048 for a single user on a channel with quasi-static Rayleigh fading.
Figure 15:
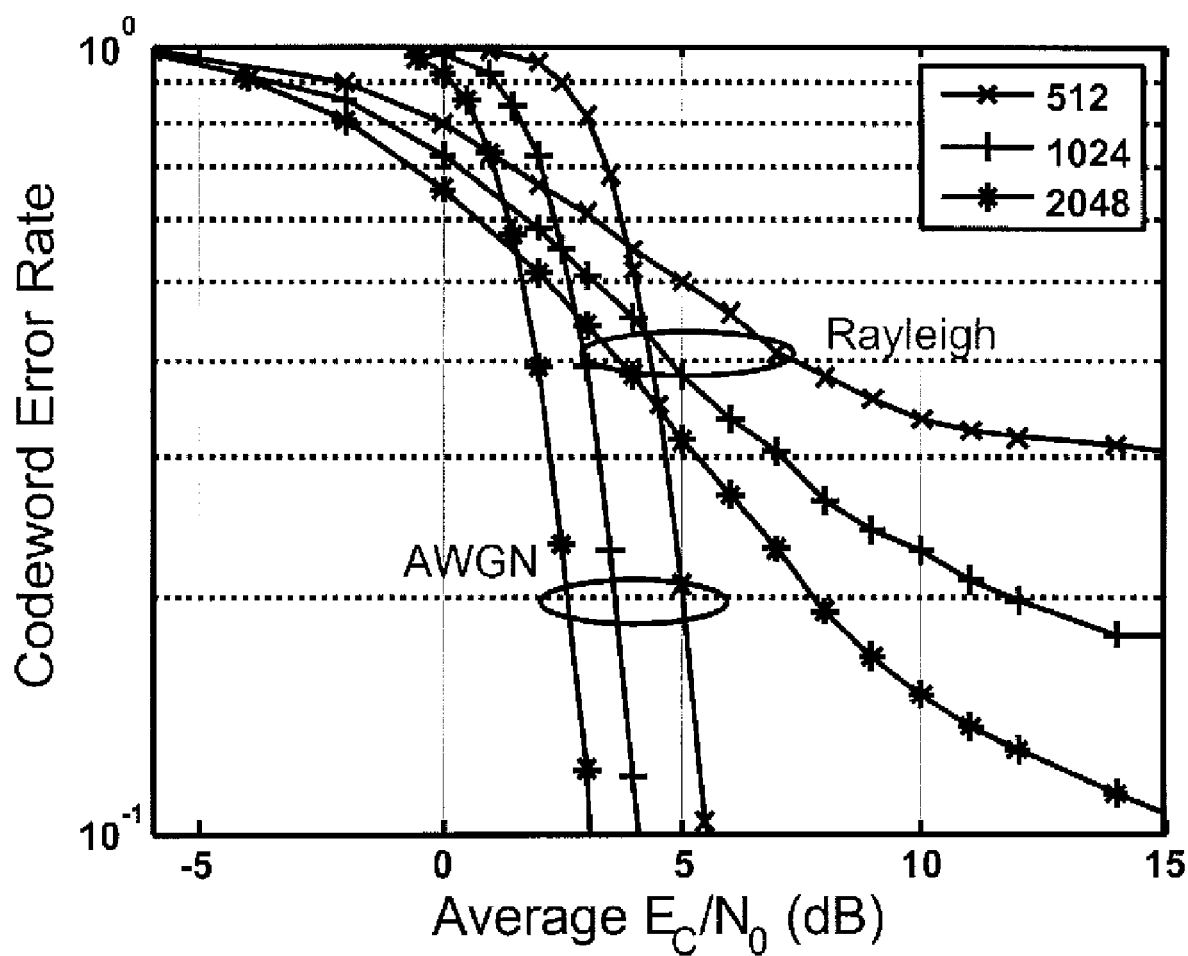
FIG. 15 is a graph showing simulated codeword error rate performance results for the apparatus of FIG. 2 using codeword lengths n of 512, 1024, and 2048 for 2 users on a channel with quasi-static Rayleigh fading, with AWGN channel performance results shown for comparison.

Referring now to FIGS. 14 and 15, there are shown simulations results for block sizes 512, 1024 and 2048 for a Rayleigh fading channel with a single user case and a two user case, respectively. The Rayleigh fading was quasi-static. That is, a Rayleigh variate was chosen to be the channel gain for the entire block and the variate was independent of other blocks. For the two user case, the Rayleigh fading variate was independent between the users.

The Rayleigh variate was generated by scaling the square root of the sum of the squares of two independent Gaussian random variates from $N(0,\sigma)$. The scale factor was chosen such that the mean of the Rayleigh variates was 1.0 (i.e., scaling by $$\frac{1}{\sigma}\sqrt{\frac{2}{\pi}}\Big).$$

The scaling results in a variance of normalized Rayleigh variate of $$\frac{4}{\pi}-1.$$

The variance is independent of the standard deviation of the Gaussian variates used to generate the Rayleigh variate.

The error statistic gathering was changed slightly from the AWGN case. In that case, a detected codeword was considered in error if it did not match the desired user's codeword. In the fading simulations with two users, the detected codeword was considered in error only if it did not match either of the users. In other words, the detector was successful if it detected either one of the users' codewords. The users were set to have an equal power prior to fading. As the application being tested was to acquire any user in the area, the performance measure is acceptable for this application.

FIG. 14 shows that the method of the present invention yields better CER performance in quasi-static Rayleigh fading at lower average $E_b/N_0$ values than in AWGN. For example, if we consider a detection rate of 1 in 5 trials (e.g., a codeword error rate of 0.8) then there are gains of approximately 2 dB for the single user case over the AWGN case.

Similarly, FIG. 15 shows the CER performance on the quasi-state Rayleigh channel with two equal powered users is better than for the 2 user AWGN case.

For the application of detecting users in a given area, poor CER performance can be mitigated by multiple attempts to recover the code phase, by using different portions of the received signal to form the sequence v of n DP values. We found that CERs worse than 0.1 are still usable for this application as the probably of successful acquisition increases with the number of attempts made. For clarity, the probability of successful acquisition is $(1-CER^i)$ where here i is the number of attempts, and it approaches one as the number of attempts increases. The application of detecting users is not delay-sensitive, so it can tolerate the delay for multiple attempts.

In one embodiment, the decoder 130 is an iterative SISO decoder, which may utilize a modified method of iterative decoding wherein a segment of the DSSS signal is split into multiple independent blocks, and then each block is iteratively decoded with a feedback from decoding of one or more of the other blocks.

Figure 16:
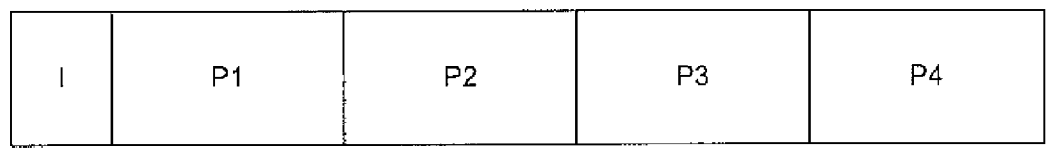
FIG. 16 is a diagram illustrating a splitting of a noisy codeword into an information block and multiple independent parity blocks 'Pm' for iterative parallel decoding thereof.

The modified iterative decoding method of this embodiment can be conveniently used, for example, when only one segment of the DSSS signal is available to the receiver for the DSSS spreading code detection. With reference to FIG. 16, the method in this embodiment utilizes successive decoding of the sequence 122 of n DP values z(l) using multiple parity sub-blocks defined therein. By way of example, FIG. 16 shows the sequence 122 of n DP values that is received by the decoder 130 divided into five sub-blocks, which include four parity sub-blocks labeled P1, P2, P3 and P4, and one sub-block I containing at least $k_c$ DP values. The decoder 130 treats the parity sub-blocks 'Pm' as comprised of parity symbols, and the sub-block I as comprised of noisy systematic bits. In the FIG. 16 example, "m" in "Pm" stays for one of 1, 2, 3, and 4. Other embodiments may utilize any suitable number of parity sub-blocks equal or greater than two. In this embodiment, the decoder 130 iteratively processes the input sequence 122 of n DP values in blocks of DP values (I Pm), each of the blocks formed of the noisy systematic sub-block I, and one of the parity sub-blocks Pm. Accordingly, each of the blocks (I Pm) of the DP values comprises the same common sub-block I of at least k DP values, and a second, i.e. parity, sub-block of DP values that are not contained in any of the other blocks of DP values.

In response to receiving each of the blocks (I Pm) of DP values, the decoder 130 outputs reliability values for the DP values of the common sub-block I. The reliability values for the common sub-block I obtained from processing one or more of the blocks (I Pm) are used to form an input for the decoder 130 when processing other blocks in a next iteration.

By way of example, the decoder 130 may process the (I P1) block utilizing elements thereof as reliability values obtained from the channel, which are known as intrinsic values, for the I and P1 bits, plus the sum of reliability values (known as extrinsic values) for elements of I that have been obtained from the decoding of (I P2), (I P3) and (I P4) in a preceding iteration. Similarly, the decoder 130, when processing any of the other blocks (I Pm), may include the reliability information the elements of the sub-block I that were generated by decoding of the other blocks. The iterations stop when a valid SCG state is found from decoding of any of the blocks (I Pm), or a maximum number of iterations is reached. Pseudo-code for this iterative block-wise deciding is presented in FIG. 17 for illustration. The iterations may be stopped when a maximum number of iterations is reached, or the decoder returns a valid state for the shift register. Here, an iteration is defined as a decoding for each of the blocks; for example, an (1832,72) block code processed with 4 parity blocks would have 4 decodings per iteration.

In one exemplary implementation of this embodiment of the method, the Vector SISO decoder was used, and decoding parameters were shortened to a 4 element vector [maximum number of iterations, max number of modifications, bias factor, scale factor for extrinsics]. The block sizes were chosen such that the decoder worked with a (512,72) code for each block, which gave good decoding performance. There are 72 information bits and each parity block is 440 bits so the overall codes tested are (440·M,72) codes where M is the number of used parity blocks.

Figure 18:
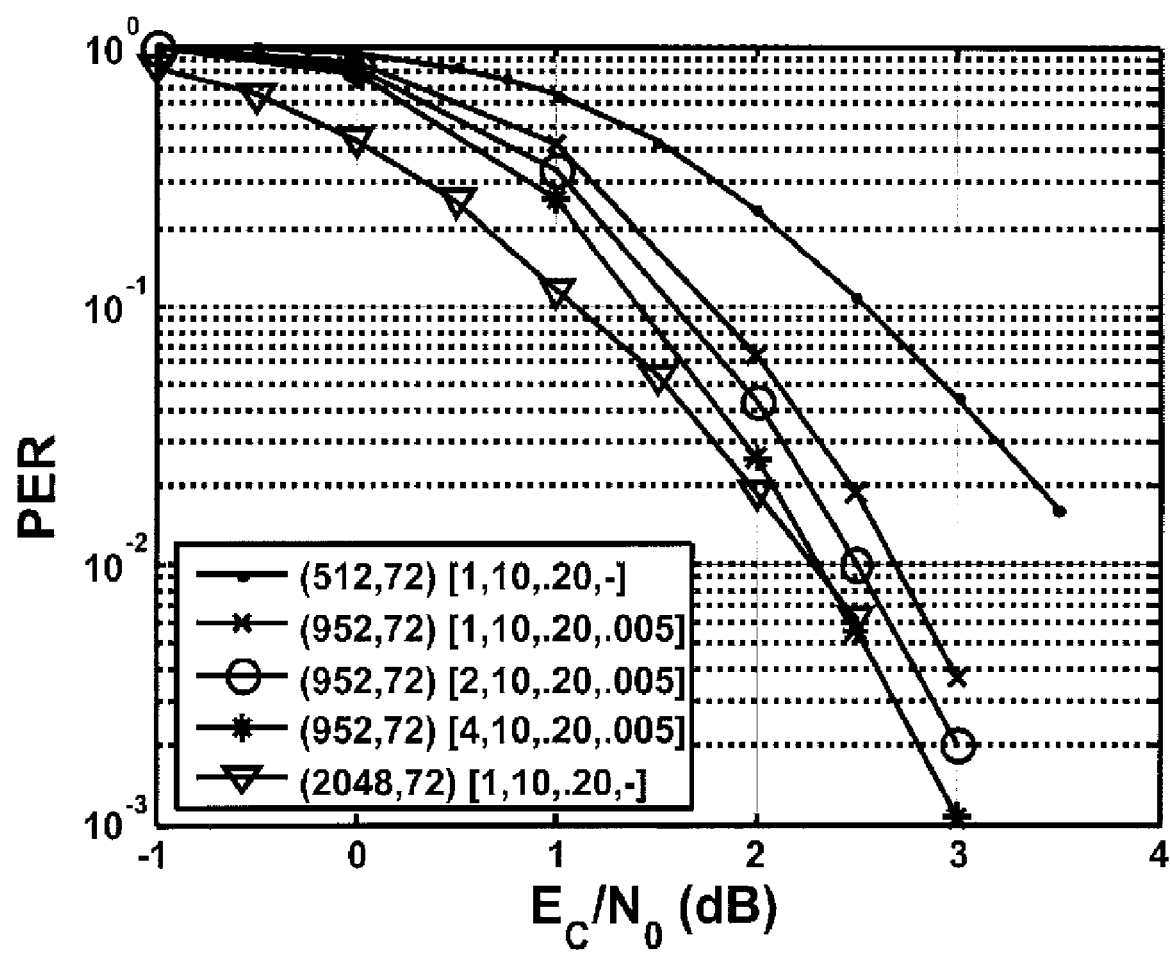
FIG. 18 is a graph showing simulated packet error rate performance results using the apparatus of FIG. 2 with the iterative parallel decoding of the noisy codeword for a (952, 72) code decoded with 2 parity blocks of size 512 defining (512,72) codes, with results of single block decoding with (512,72) and (2048,72) block codes included for reference.

In FIG. 18, the results for the (952,72) code processed with two blocks of parity with the (512,72) code is shown for 1, 2, and 4 iterations. The results for the (512,72) and (2048,72) codes (processed in one block) are shown for comparison. The results show that there can be a gain in performance for processing and combining the independent blocks of parity and an iterative decoder.

The method and apparatus provided by the present invention in various embodiments thereof can be adopted for blind acquisition of spreading codes generated using non-binary spreading generators, as long as an equivalent binary spreading generator can be constructed. In such embodiments, the ECG state 142 that is generated by the state generator 140 is understood to be a state of the equivalent binary spreading generator, and the local SCG 160 is the equivalent binary spreading generator. As used in this specification, the terms "equivalent binary spreading generator" or "equivalent spreading generator" are used interchangeably to mean a binary spreading code generator, which in one state thereof generates the same complex spreading code {C} as the SCG that was used at the transmitter to form the DSSS signal.

As an example, one mode of the wideband CDMA (WCDMA) cellular standard found in 3rd Generation Partnership Project: Technical Specification Group Radio Access Network; Spreading and modulation (FDD) (Release 7), 3GPP TS 25.213 V7.4.0 (2007-11) uses a linear feedback shift register over the ring of integers modulo 4 in generating two binary sequences known as short spreading codes.

Figure 19:
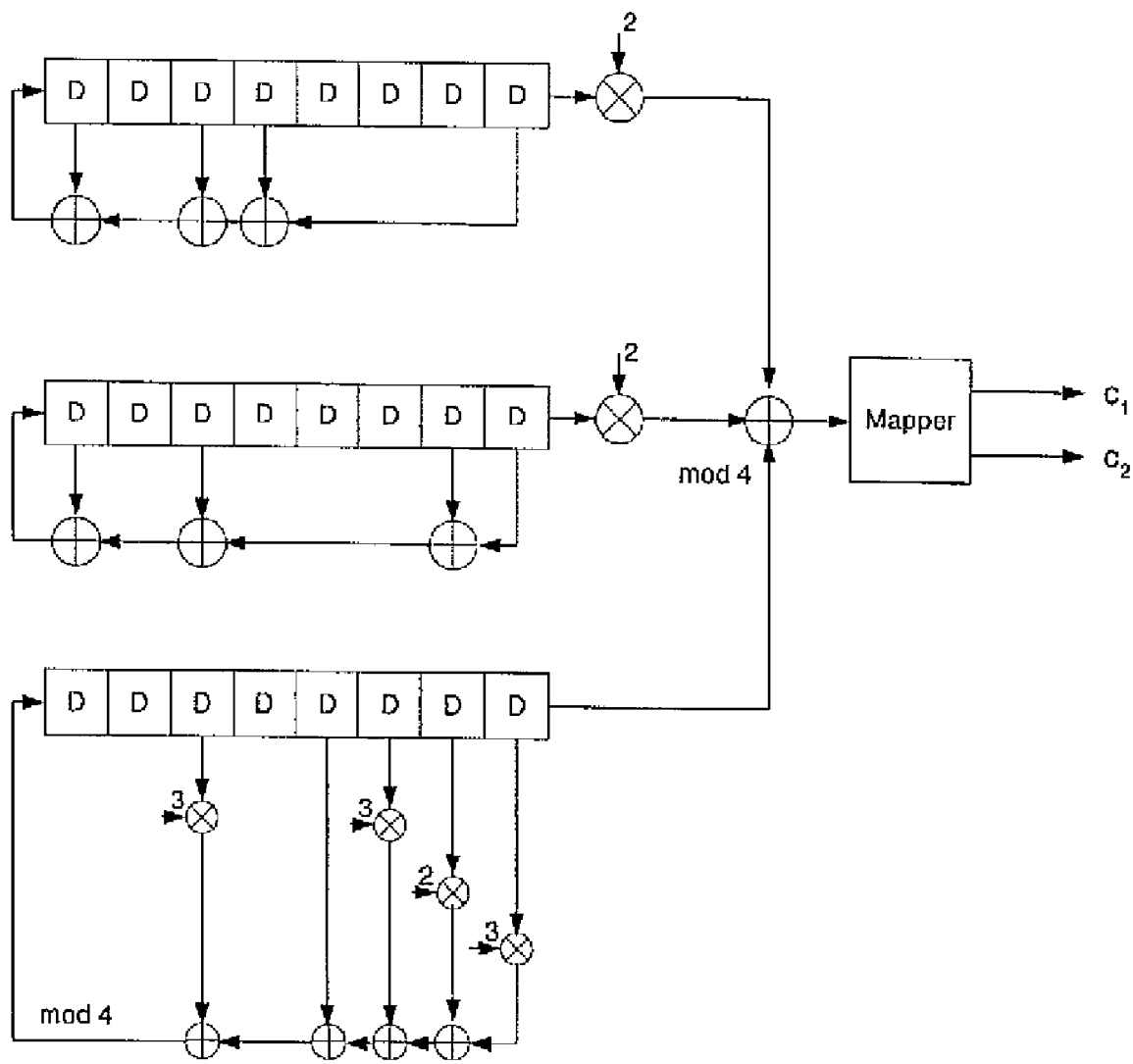
FIG. 19 is a block diagram of the reverse channel short spreading code generator according to a mode of the WCDMA standard.

A diagram of the linear feedback shift registers for generating the short sequences $c_1$ and $c_2$ in the WCDMA standard is shown in FIG. 19. These short sequences $c_1$ and $c_2$, are combined as shown in FIG. 1 to produce the binary complex spreading code C to be modulated by the data D. Accordingly, equations (1)-(7) generally apply to the DSSS signals generated using the WCDMA standard.

Advantageously, the short sequences $c_1$ and $c_2$ defined in the WCDMA standard, although generated by the non-binary sequence generator of FIG. 19, are binary, and as we found can also be generated by two linear binary systems of equations. Knowing this, one skilled in the art will be able to find these two linear binary systems of equations and thus construct an equivalent binary spreading generator.

These two linear binary systems of equations that generate the spreading sequences $c_1$ and $c_2$ can be used to compute the generator matrix G for the codeword with elements described by the RHS of equation 7. The parity check matrix H and pseudo-inverse matrix P# can then be computed using equations 11 and 13, respectively, thereby enabling to suitably program or design the DP processor 120, the decoder 130, and the state processor 140 of the SAP 125.

With the SAP 125 thereby properly designed, the apparatus of FIG. 2 can be utilized to receive the WCDMA signal and acquire therefrom a WCDMA spreading sequence. In this embodiment, the receiver front end formed of blocks 110, 112, 113 and 115 is configured to receive, down-convert, and sample the 5.0 MHz signal that is operating at 3.84 Mchip/second.

As described hereinabove, the decoder 130 uses constraints in the parity check matrix H to find the codeword 132; the state computer 140 may utilize the pseudo-inverse matrix P# to solve for the state 142 of the equivalent binary spreading code generator (EBSCG). The state 142 of the EBSCG generated thereby can be validated, for example, using the state validation method described hereinabove with reference to FIG. 5, wherein the EBSCG is used as the local SCG 160 to generate the complex spreading sequence C, which can then be passed to the despreader 170 to attempt to despread a delayed version of the WCDMA signal from the buffer 163.

The state 142 is accepted if the error detector circuit 151 declares the despreading operation successful, thereby completing the acquisition of the spreading code of the WCDMA signal.

Figure 20:
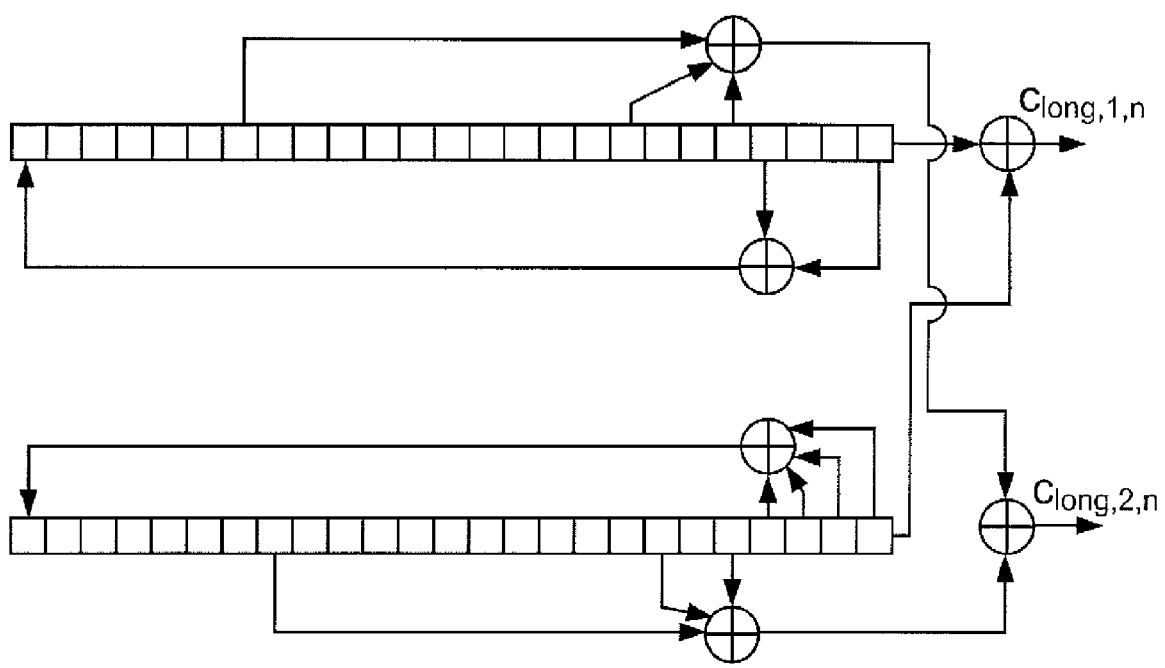
FIG. 20 is a block diagram of the reverse channel spreading code generator for generating the long sequence according to a mode of the WCDMA standard.

In another embodiment, the DSSS signal received by the apparatus 100, 200 or 300 may be generated according to a mode of the wideband CDMA cellular standard found in 3rd Generation Partnership Project: Technical Specification Group Radio Access Network; Spreading and modulation (FDD) (Release 7), 3GPP TS 25.213 V7.4.0 (2007-11), which uses long spreading codes to generate the complex spreading sequence C. A diagram of the LFSR for generating the long codes according to this standard is shown in FIG. 20. The complex spreading sequence is then generated as in SCG 5 shown in FIG. 1. The acquisition of this complex spreading code from the WCDMA signal spread therewith can be performed similarly to the aforedescribed case of the short spreading codes, by first constructing an equivalent binary spreading generator for the SCG 5 based on the long sequence LFSRs of FIG. 20, and then designing the decoder 130 and the state computer 140 of the SAP 125 based on the pseudo-inverse matrix, the parity matrix, and/or the generator matrix, that are pre-computed for the equivalent binary spreading generator.

The received WCDMA signal can then be de-spread using a complex spreading sequence generated by a local copy of the equivalent binary spreading generator.

The method and apparatus of the present invention for complex spreading code acquisition, which have been described hereinabove with reference to specific embodiments, is applicable both for binary and non-binary modulation formats, i.e. when the data signal D that is used to modulate the spreading code $\{C\}$ is either a binary or non-binary. When the data signal D is binary, the DP values generated by the DP processor 120, when correctly aligned with the spreading code, are generally independent on the data signal, both in sign and magnitude, as follows from equation (7). This property is retained also for DSSS signals generated using conventional QPSK modulation and m-ary PSK, thereby making the decoding advantageously data-independent. For other non-binary modulation formats, such as QPSK with orthogonal channelization, QAM, 16 rectangular QAM, 32 QAM cross, 64 QAM, the magnitude of the DP values is proportional to a data-dependent factor ($d_{1,n}^2 + d_{2,n}^2$), and therefore fluctuates depending on data. However, this factor is the sum of the squared magnitudes of the data symbol values, thus it is always positive. Since the (n, $k_c$) block code for the decoder 130 encodes the sign of the DP values z(l) but not the magnitude thereof, the same decoder 130 that is designed for binary modulation formats can still provide a correct codeword for the non-binary formats, so that the SCG state may be acquired without modification on the decoder 130 independently on the used modulation format.

Exemplary embodiments described hereinabove utilize a particular form of the DP operation that is generally equivalent to taking an imaginary part of a product of the sampled DSSS signal $\hat{r}=\{\hat{r}(i)\}$ and a complex conjugate copy thereof that is shifted by one chip interval; it can be conveniently implemented using a linear combination of cross-products of the in-phase and quadrature components, I and Q, of the sampled DSSS signal $\hat{r}$ as defined by equation (9) and is illustrated in FIG. 3. However, other embodiments may implement other forms of the DP operation, provided that it produces bipolar DP values, which sign is substantially independent on the data signal and can be described as a linear binary code that is uniquely related to the state of the SCG and may be thus decoded using a suitable decoder.

Accordingly, the DP operation may be adopted for a particular application in dependence on the structure of the SCG used in producing the DSSS signal, so as to exploit correlations between consecutive chips of the complex spreading code produced thereby.

By way of example, consider an embodiment wherein the spreading code $C_i$ of the DSSS signal that is defined by the equation $$C_i = c_{1,i} \cdot [1 + j \cdot c_{2,2p}],$$

[0] and which is a quadrature combination of the first spreading code $c_{1,i}$ and the second spreading code $c_{2,i}$ that is decimated by 2 so that each chip value of the second spreading code is extended over two chip intervals of the first spreading code, thereby creating a correlation between adjacent chips of the spreading code than may be exploited at the receiver to reduce the dependence on the data. Here, $C_i$ represents a chip value of an $i^{th}$ chip of the spreading code of the DSSS signal, $c_{1,i}$ represents a chip value of an $i^{th}$ chip of the first spreading code, $c_{2,2p}$ represents a chip value of a $(2p)^{th}$ chip of the second spreading code, and p is a greatest integer not exceeding i/2.

In this embodiment, the DP operation may include using a sequence of 2n in-phase signal samples I(t) and a sequence of 2n corresponding quadrature signal samples Q(t) to form the first sequence of n DP values z(l) according to an equation $$z(l)=I(l)I(l-1)-Q(l-1)Q(l),$$

wherein integer l=2t indicates relative position of DP values in the sequence, and wherein integer index t=1, 2, . . . , 2n denotes time samples defined at the chip rate Rc, so that consecutive time samples correspond to consecutive chips of the spreading code C of the DSSS signal.

Although particular embodiment of the invention have been described hereinbelow primarily with reference to wireless DS-CDMA transmission, many of the aforedescribed embodiments are also applicable, either without modifications or with modifications that would be evident to a skilled practitioner, to spreading code acquisition for other types of DSSS signals. For example, it can be used in applications wherein the DS spreading is used to lower the power spectral density of a wireless signal.

The present invention has been fully described in conjunction with the exemplary embodiments thereof with reference to the accompanying drawings. It should be understood that each of the preceding embodiments of the present invention may utilize a portion of another embodiment, and should not be considered as limiting the general principals discussed herein. Of course numerous other embodiments may be envisioned without departing from the spirit and scope of the invention; it is to be understood that the various changes and modifications to the aforedescribed embodiments may be apparent to those skilled in the art. Such changes and modifications are to be understood as included within the scope of the present invention as defined by the appended claims.

We claim:

1. A method for acquiring a complex spreading code from a direct sequence spread spectrum (DSSS) signal, the DSSS signal comprising a data signal spectrally spread with the complex spreading code, the method comprising:
   a) receiving a sampled DSSS signal obtained by sampling the DSSS signal at a sampling rate at least equal to a chip rate of the complex spreading code, the sampled DSSS signal comprising in-phase signal samples and quadrature signal samples;
   b) forming a bipolar differential product (DP) signal from the in-phase and quadrature signal samples using a differential product operation, the bipolar DP signal comprising DP values having a sign that is generally independent on the data signal;
   c) providing a first sequence of n DP values to a decoder for obtaining a first codeword of a linear block code (n, k), wherein the linear block code (n, k) is defined by a spreading code generator (SCG) for generating the complex spreading code and by the differential product operation, wherein k is a length of the SCG, and n is a positive integer greater than k; and,
   d) determining, based on the first codeword, a first SCG state estimate for generating the complex spreading code.

2. The method of claim 1, wherein:
   the complex spreading code comprises a quadrature combination of a first spreading code and a second spreading code, wherein each chip value of the second spreading code extends over two chip intervals of the first constituent spreading code; and,
   each DP value in step b) is obtained by combining the in-phase and quadrature signal samples for two consecutive chip intervals of the complex spreading code.

3. The method of claim 2, wherein:
   the spreading code of the DSSS signal is an alternate-phase quadrature combination of the first spreading code and the second spreading code defined in accordance with a following equation:

$$C(i)=c_1(i)\cdot[1+j(-1)^i c_2(2p)],$$

wherein C(i) represents a chip value of an $i^{th}$ chip of the complex spreading code of the DSSS signal, $c_1(i)$ represents a chip value of an $i^{th}$ chip of the first spreading code, $c_2(2p)$ represents a chip value of a $(2p)^{th}$ chip of the second spreading code, and p is a greatest integer not exceeding i/2; and, step b) comprises using a sequence of 2n in-phase signal samples I(t) and a sequence of 2n corresponding quadrature signal samples Q(t) to form the first sequence of n DP values z(l) according to an equation $$z(l)=I(l)Q(l-1)-I(l-1)Q(l),$$

wherein integer index l=2t, integer index t=1, 2, . . . , 2n denotes time samples, wherein consecutive time samples correspond to consecutive chips of the complex spreading code of the DSSS signal.

4. The method of claim 1, wherein step d) is performed using a pre-computed characteristic of the linear block code (n, k).

5. The method of claim 2, further comprising the step of
   e) validating the first SCG state estimate using a pre-determined criterion.

6. The method of claim 5, wherein step e) comprises computing, based on the first codeword, states of spreading generators for generating the first and second spreading codes, and verifying whether the computed states form a valid state combination.

7. The method of claim 2, further comprising:
   loading the first SCG state estimate into a local SCG capable of generating the spreading code to generate a candidate spreading sequence; and,
   applying the candidate spreading sequence to the received DSSS signal for de-spreading thereof and obtaining a de-spread signal.

8. The method of claim 7, comprising:
   verifying whether the de-spread signal satisfies a pre-determined condition; and,
   accepting the first SCG state estimate as a valid state of the SCG if the pre-determined condition is satisfied.

9. The method of claim 5, wherein the state validation step comprises:
   providing a second sequence of n DP values to the decoder to obtain a second codeword, wherein the second sequence is shifted in time with respect to the first sequence by a time shift of M chip intervals, wherein M>1;
   computing a second SCG state estimate based on the second codeword;
   computing a third SCG state estimate from the first SCG state estimate based on the time shift M between the respective first and second DP sequences and a known structure of the SCG;
   comparing the second and third SCG state estimates and, if they are equal, accepting one of the first or second SCG state estimates as a valid state of the SCG.

10. The method of claim 4, wherein the pre-computed characteristic is a matrix which elements are stored in a nontransitory computer-readable memory, and wherein step d) comprises multiplying the matrix by the first codeword to obtain the first SCG state estimate.

11. The method of claim 5, wherein the decoder is an iterative decoder, and wherein steps c) to e) are iteratively repeated until the predetermined criterion is satisfied.

12. The method of claim 2, wherein step b) comprises:
computing a DP value for each two consecutive chip intervals for a portion of the sampled DSSS signal corresponding in length to at least 2n chip intervals, so as to obtain a sequence of at least 2n DP values; and,
down-sampling the sequence of at least 2n DP values to obtain the first sequence of n DP values z(l).

13. The method of claim 1, wherein the decoder comprises a soft input soft output (SISO) decoder, and wherein step c) comprises
iteratively processing the first sequence of n DP values by the SISO decoder in blocks of DP values, each of the blocks comprising a same common sub-block of at least k DP values from the first sequence and a second sub-block of DP values from the first sequence that are not contained in any of the other blocks of DP values,
wherein the SISO decoder outputs reliability values for the at least k DP values of the common sub-block in response to receiving each block of DP values; and,
wherein the reliability values for the at least k DP values of the common sub-block obtained from processing one or more of the blocks of the DP values are used to form an input for the SISO decoder when processing the blocks of the DP values in a next iteration.

14. The method of claim 5, comprising iteratively repeating steps c)-e) until the pre-determined criterion is satisfied, while selecting the first sequence of n DP values from differing portions of the DP signal.

15. The method of claim 14, wherein the differing portions of the DP signal correspond to shifting a beginning of the first sequence of n DP values by one or more chip intervals.

16. An apparatus for acquiring a phase of a complex spreading code from a direct sequence spread spectrum (DSSS) signal, the DSSS signal comprising a data signal spectrally spread with the complex spreading code, the apparatus comprising:
a memory for storing at least a portion of a sampled DSSS signal obtained from the DSSS signal by sampling thereof at a sampling rate at least equal to a chip rate of the spreading code, the sampled DSSS signal comprising an in-phase signal composed of in-phase signal samples, and a quadrature signal composed of quadrature signal samples;
a differential product (DP) processor operatively coupled to the memory for generating a sequence of n bipolar DP values from the in-phase and quadrature signals using a DP operation, the bipolar DP values having a sign that is generally independent on the data signal;
a decoder operatively coupled to the DP processor for receiving the sequence of n bipolar DP values, and for obtaining therefrom a codeword of a linear block code (n, $k_c$), wherein k is a length of a spreading code generator (SCG) for generating the spreading code, and n is a positive integer greater than k, and wherein the linear block code (n, $k_c$) is defined by the SCG and the linear differential product operation; and,
a state computer operatively coupled to the decoder for receiving the codeword and for computing therefrom an SCG state estimate based on a pre-computed characteristic of the linear block code (n, $k_c$).

17. The apparatus of claim 16, comprising a state validator operatively coupled to the state computer for determining if the SCG state estimate is a valid state of the SCG.

18. The apparatus of claim 16, further comprising:
a local spreading code generator (LSCG) operatively coupled to the state estimator for generating a spreading code in response to a state estimate received therefrom;
a de-spreader operatively coupled to the LSCG and the buffer memory for de-spreading the sampled DSSS signal stored therein using the spreading code.

19. The apparatus of claim 16, wherein the DP processor comprises an 2m:1 down-sampler for down-sampling a sequence of DP values starting with a selected position in the sequence, wherein m is a number of in-phase or quadrature signal samples in one chip interval of the spreading code.

20. The apparatus of claim 16, wherein the decoder comprises a first memory for storing a pre-computed parity matrix or a pre-computed generator matrix for generating the codeword from the first sequence of n DP values, and wherein the state computer comprises a second memory for storing a pre-computed pseudo-inverse matrix for generating an SCG state from a codeword.

* * * * *